Oct. 11, 1955
H. P. LUHN
2,720,360
CARD SCANNING MECHANISM
Filed March 31, 1950
32 Sheets-Sheet 2
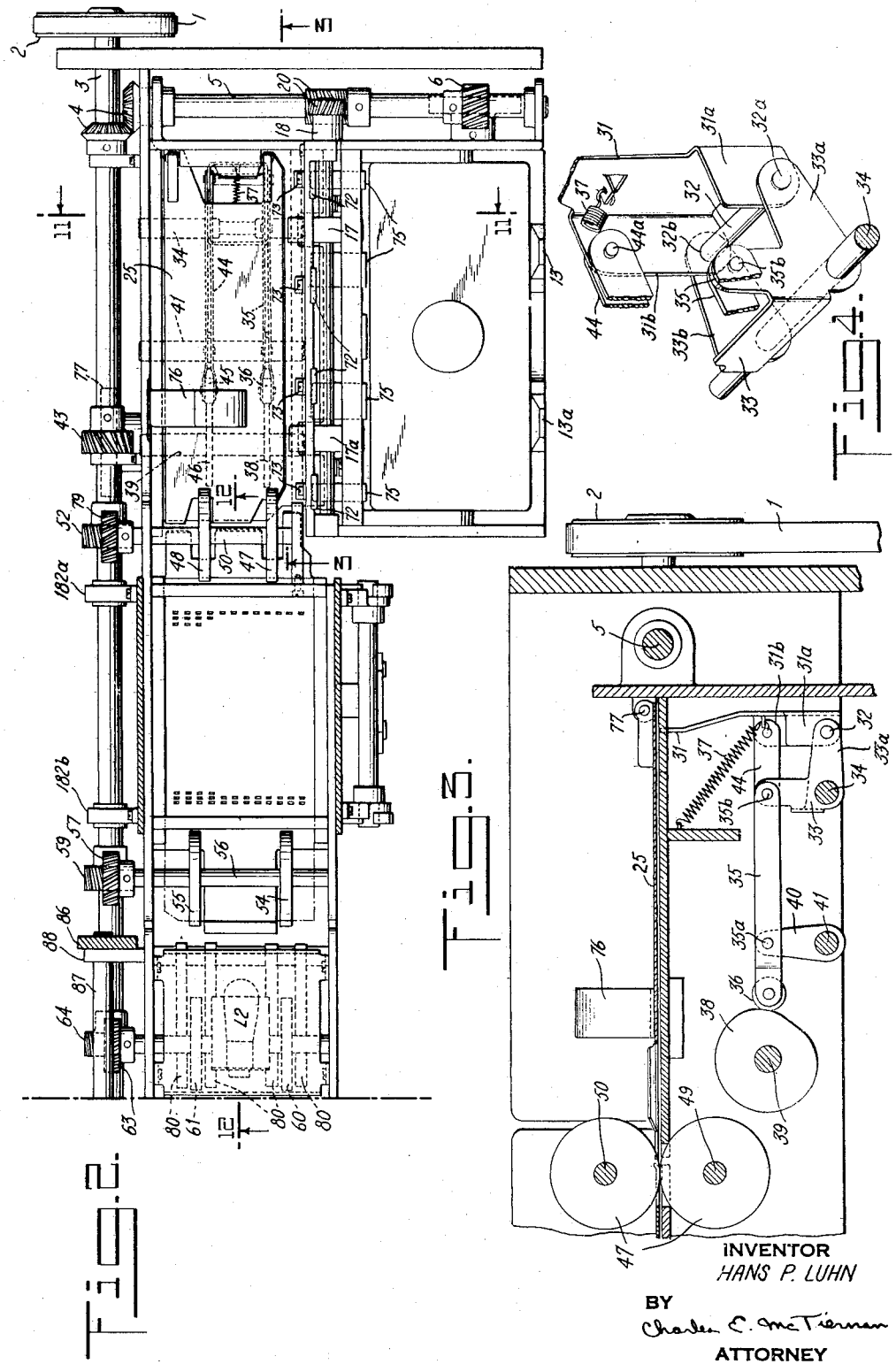
INVENTOR
HANS P. LUHN
BY
Charles C. McTiernan
ATTORNEY

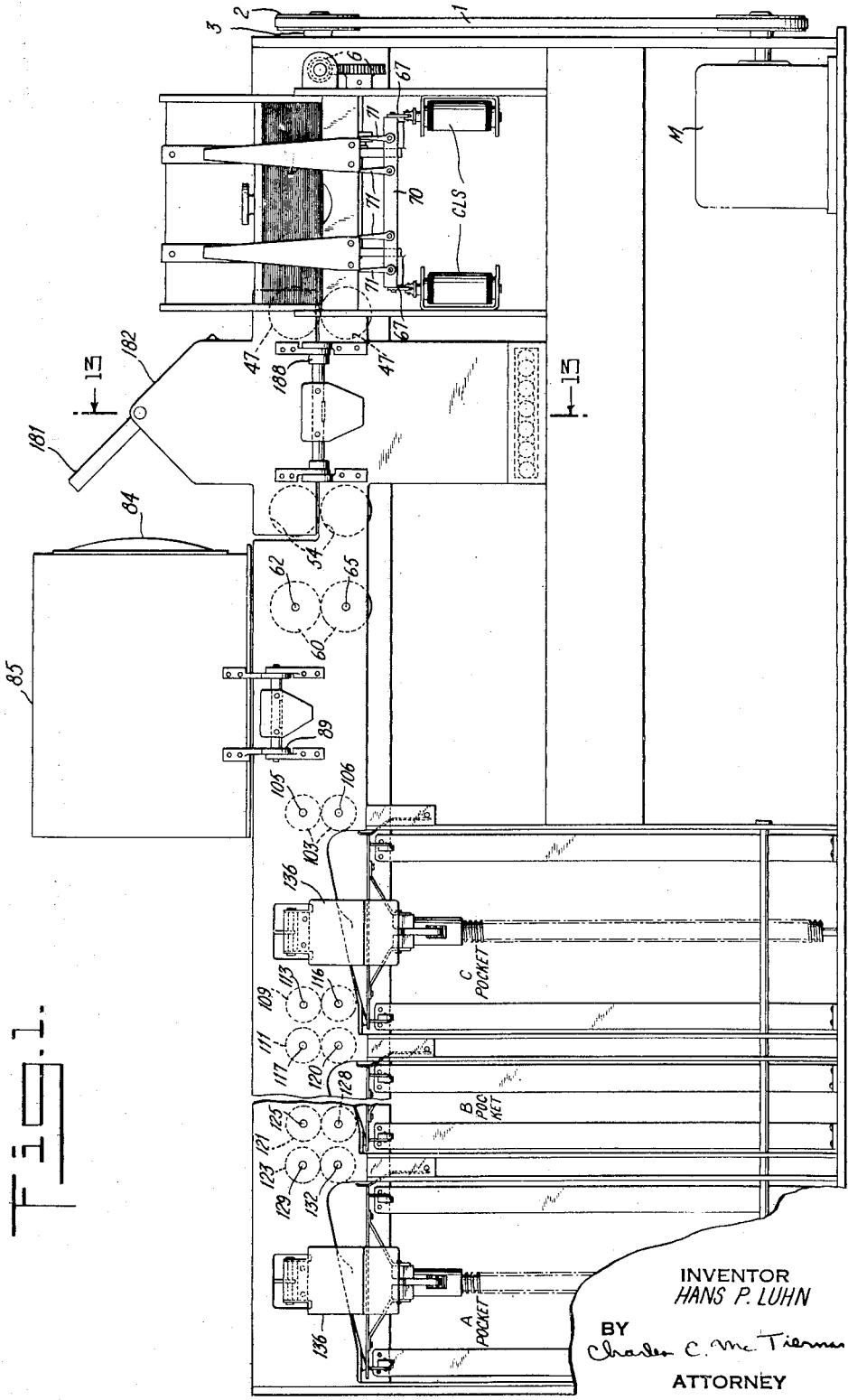

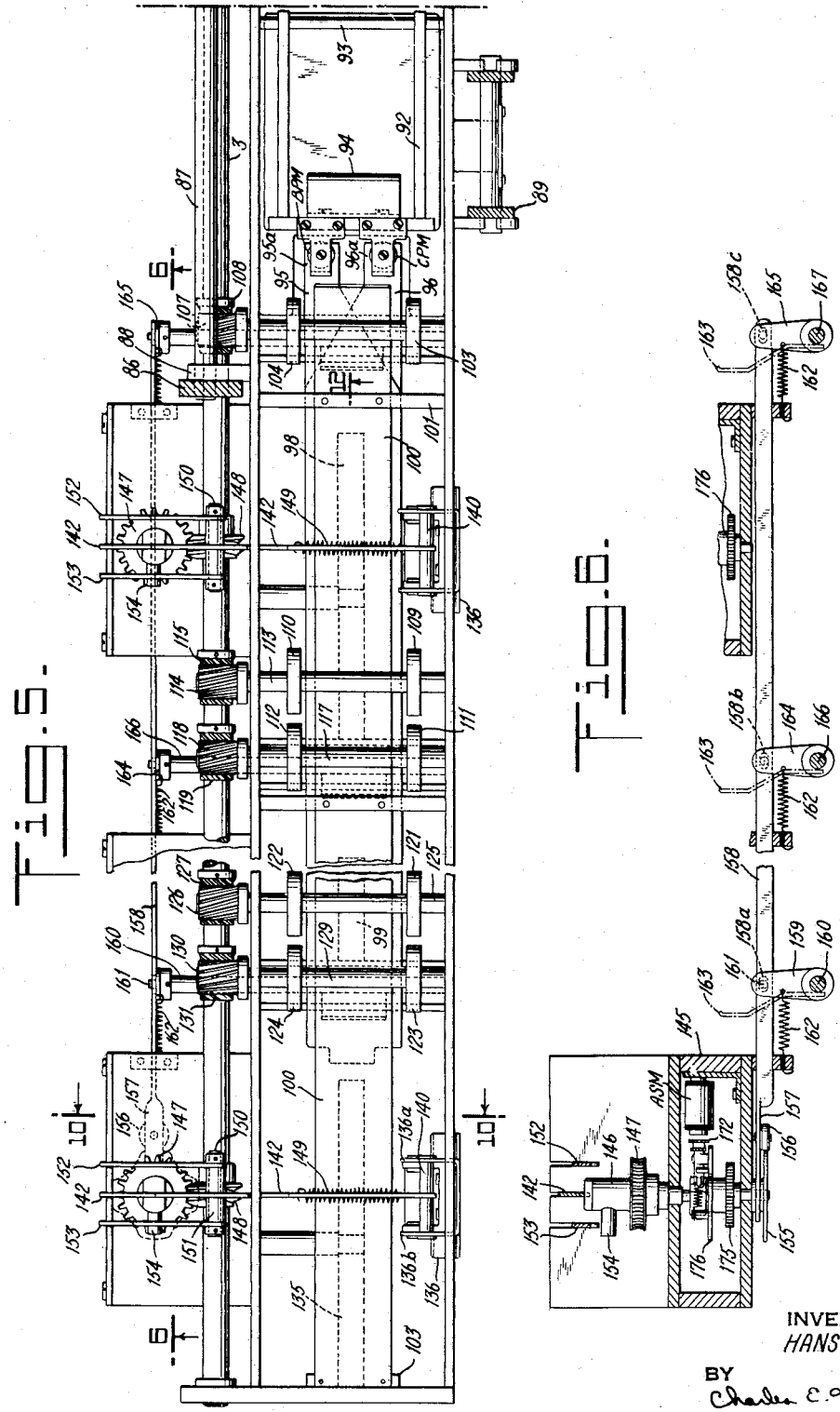

Oct. 11, 1955  H. P. LUHN  2,720,360
CARD SCANNING MECHANISM
Filed March 31, 1950  32 Sheets-Sheet 4
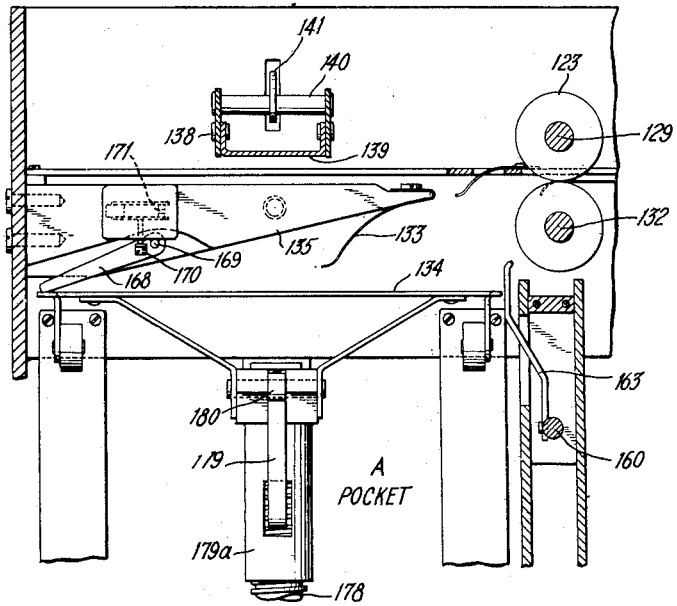
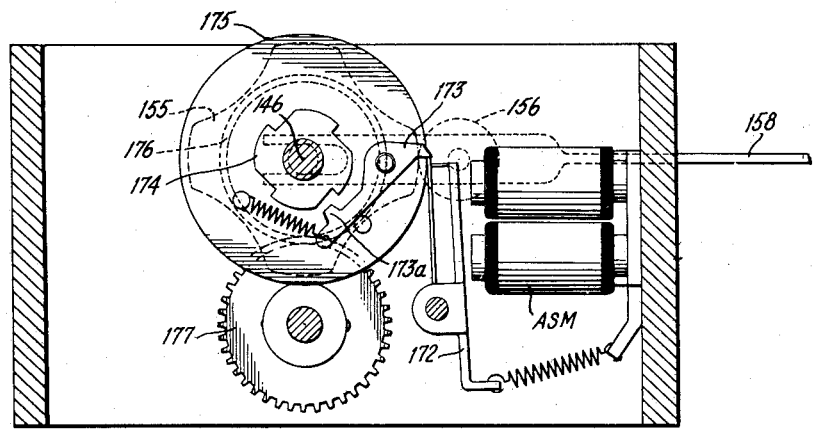
INVENTOR
*HANS P. LUHN*
BY
Charles C. McTiernan
ATTORNEY Oct. 11, 1955        H. P. LUHN        2,720,360
CARD SCANNING MECHANISM
Filed March 31, 1950        32 Sheets-Sheet 5
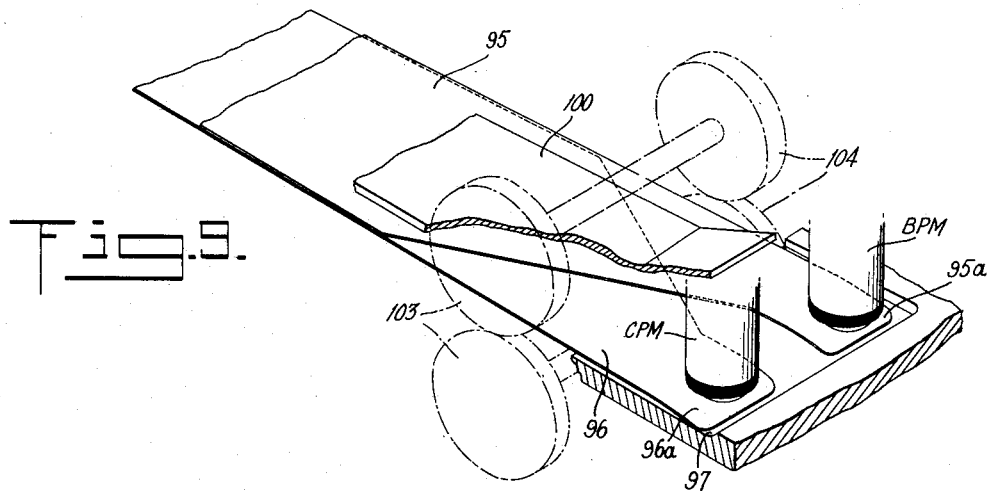
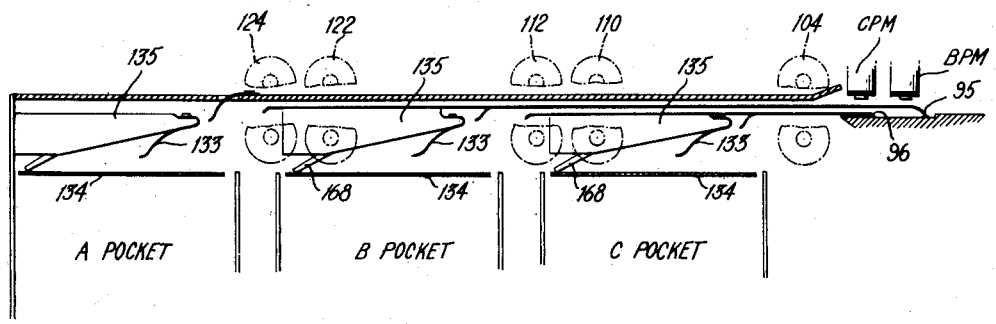
INVENTOR
HANS P. LUHN
BY
ATTORNEY

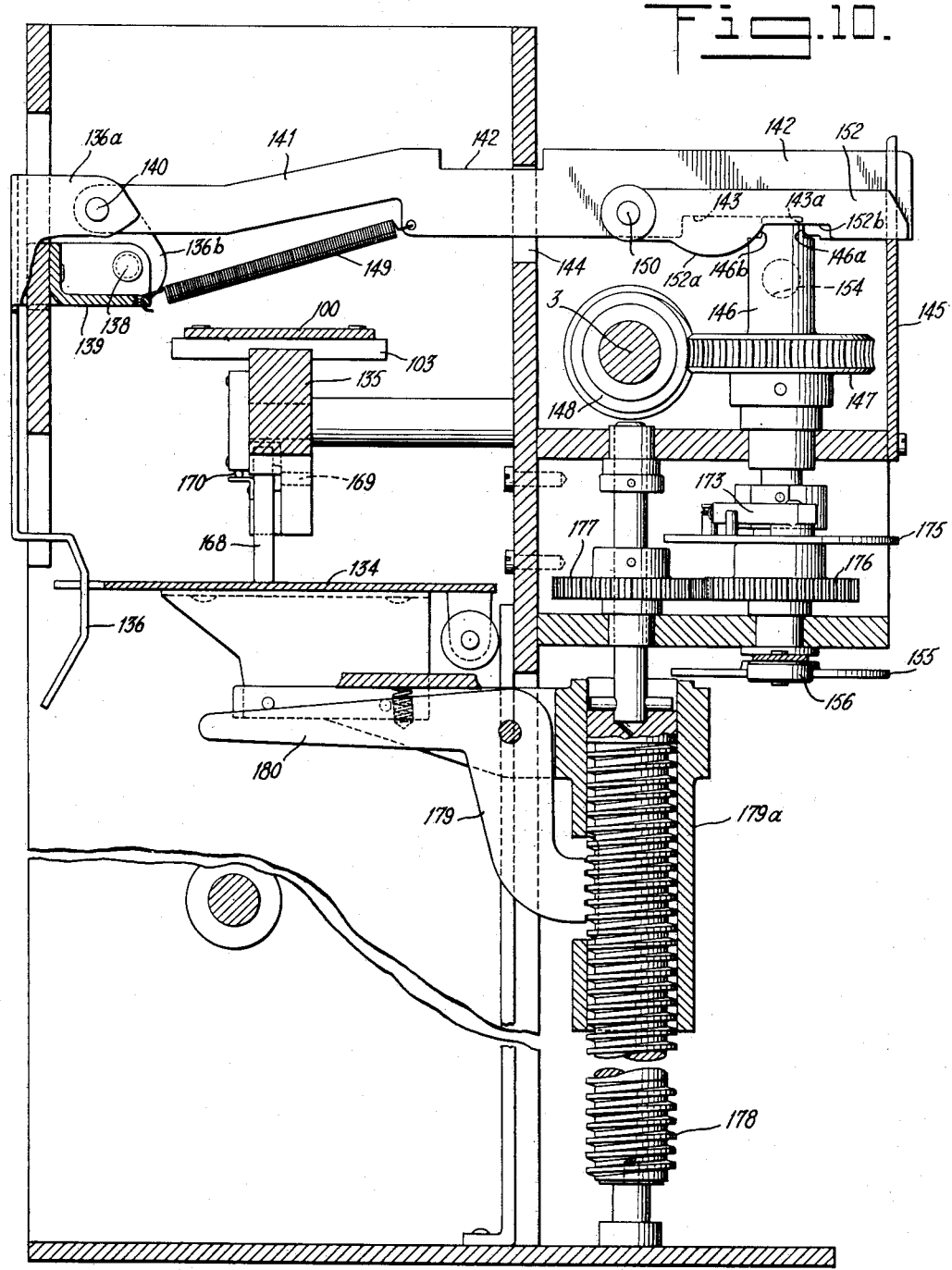

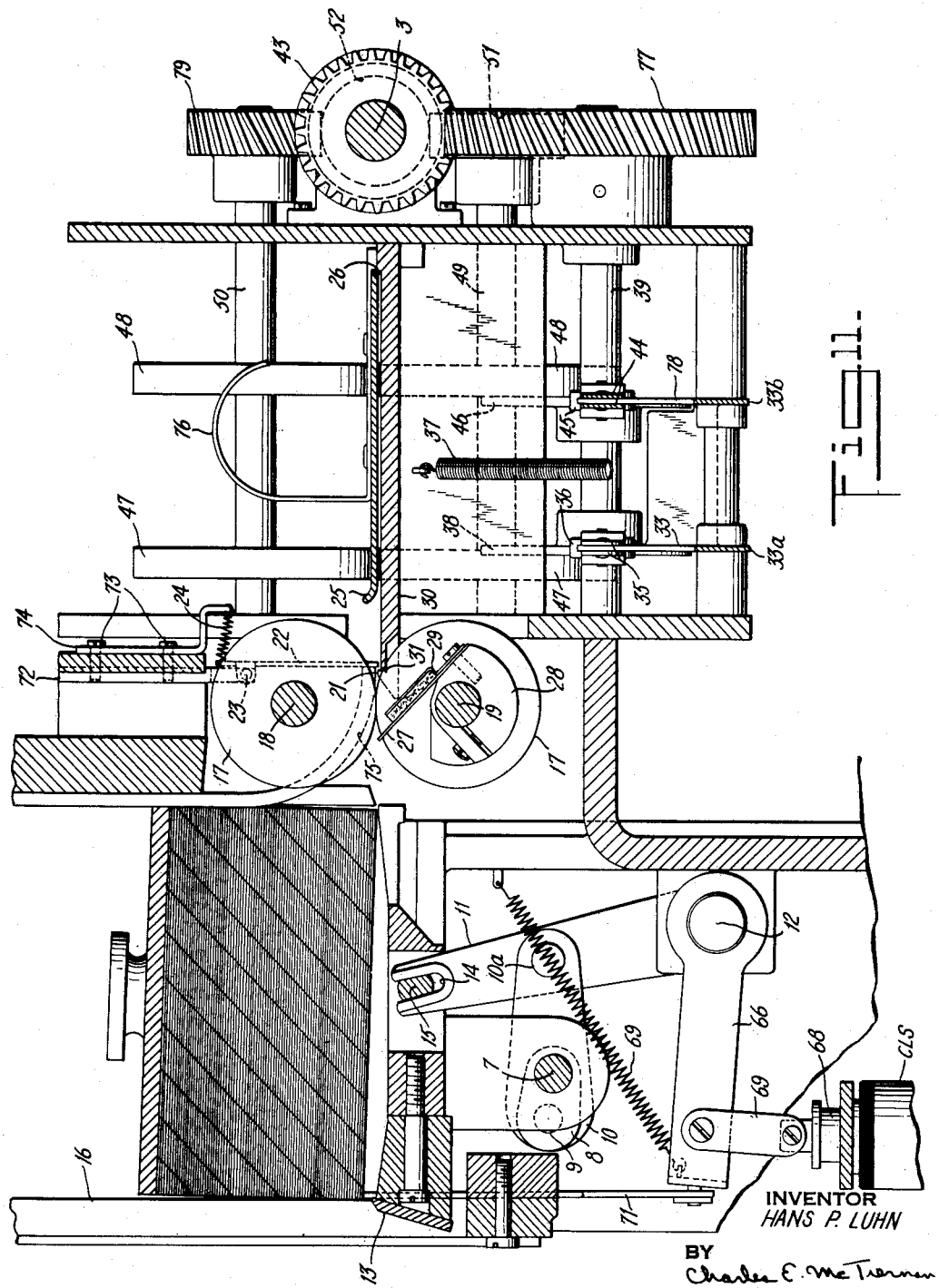

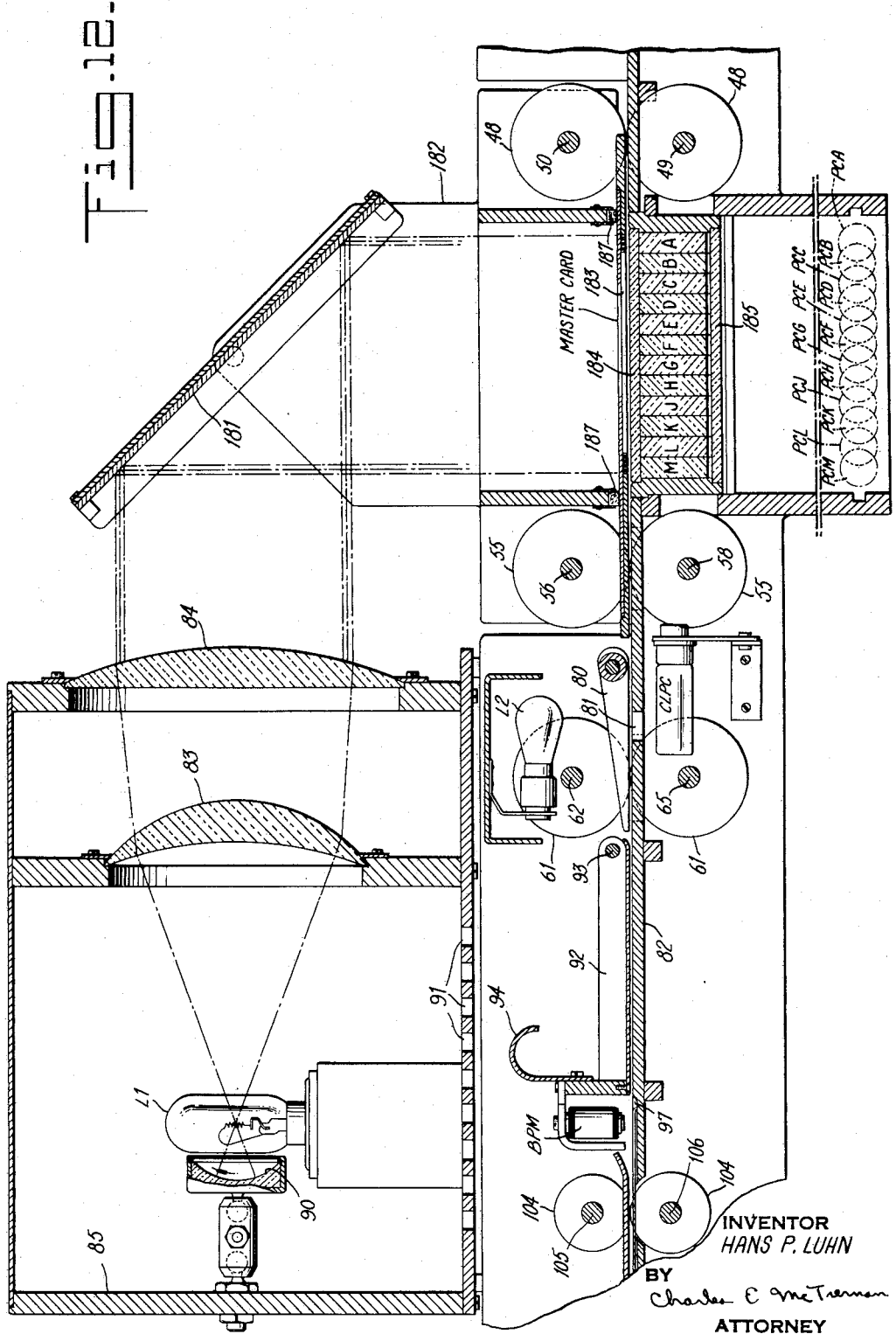

Oct. 11, 1955  H. P. LUHN  2,720,360
CARD SCANNING MECHANISM
Filed March 31, 1950  32 Sheets-Sheet 9

INVENTOR
HAN P. LUHN
BY
Charles C. McTiernan
ATTORNEY

Oct. 11, 1955

H. P. LUHN 2,720,360

CARD SCANNING MECHANISM

Filed March 31, 1950

INVENTOR
HANS P. LUHN
BY
Charles E. McTiernan
ATTORNEY

Oct. 11, 1955        H. P. LUHN        2,720,360
CARD SCANNING MECHANISM
Filed March 31, 1950                              32 Sheets-Sheet 11

Fig. 15.

| | Geographical Location of Branch Offices-Table 97* | | | | |
|---|---|---|---|---|---|
| 0 | Alabama | Idaho | Michigan | New York | Tenn. |
| 1 | Arizona | Illinois | Minnesota | No. Carolina | Texas |
| 2 | Arkansas | Indiana | Mississippi | No. Dakota | Utah |
| 3 | California | Iowa | Missouri | Ohio | Vermont |
| 4 | Colorado | Kansas | Montana | Oklahoma | Virginia |
| 5 | Connecticut | Kentucky | Nebraska | Oregon | Washington |
| 6 | Delaware | Louisiana | Nevada | Penn. | West Va. |
| 7 | District of Col. | Maine | New Hampshire | Rhode Island | Wisconsin |
| 8 | Florida | Maryland | New Jersey | So. Carolina | Wyoming |
| 9 | Georgia | Massachusetts | New Mexico | So. Dakota | Hawaii |
| | Col.#1 | Col.#2 | Col.#3 | Col.#4 | Col.#5 |

Fig. 16.

INVENTOR
HANS P. LUHN
BY
Charles E. McTiernan
ATTORNEY

Oct. 11, 1955 H. P. LUHN 2,720,360
CARD SCANNING MECHANISM
Filed March 31, 1950 32 Sheets-Sheet 12

INVENTOR
HANS P. LUHN
BY
Charles E. McTiernan
ATTORNEY

Oct. 11, 1955            H. P. LUHN            2,720,360

CARD SCANNING MECHANISM

Filed March 31, 1950                        32 Sheets-Sheet 13

Fig. 19.

A1-INDEX SERIES

Fig. 20.

A2-INDEX SERIES

INVENTOR
HANS P. LUHN
BY
Charles E. McTiernan
ATTORNEY

Oct. 11, 1955     H. P. LUHN     2,720,360

CARD SCANNING MECHANISM

Filed March 31, 1950     32 Sheets-Sheet 14

Fig. 21.

B1 - INDEX SERIES

Fig. 22.

B2 - INDEX SERIES

INVENTOR
HANS P. LUHN
BY
Charles C. McTiernan
ATTORNEY

Oct. 11, 1955     H. P. LUHN     2,720,360
CARD SCANNING MECHANISM
Filed March 31, 1950     32 Sheets-Sheet 15

INVENTOR
HANS P. LUHN
BY
ATTORNEY

Oct. 11, 1955  H. P. LUHN  2,720,360
CARD SCANNING MECHANISM
Filed March 31, 1950  32 Sheets-Sheet 16

Fig. 26.

D1-MAJOR SERIES
(accompanied by X or Y)

Fig. 27.

D2-MAJOR SERIES
(accompanied by X or Y)

INVENTOR
HANS P. LUHN
BY
Charles E. McTiernan
ATTORNEY

Oct. 11, 1955        H. P. LUHN        2,720,360

CARD SCANNING MECHANISM

Filed March 31, 1950        32 Sheets-Sheet 18

INVENTOR
HANS P. LUHN

BY
Charles C. McT......
ATTORNEY

Oct. 11, 1955  H. P. LUHN  2,720,360
CARD SCANNING MECHANISM
Filed March 31, 1950  32 Sheets-Sheet 19
Fig. 34.
| | Index Series | | | | Major Series | | | | | Minor Series | | | |
|---|---|---|---|---|---|---|---|---|---|---|---|---|---|
| | A1 | A2 | B1 | B2 | C1 | C2 | D1 | D2 | E | F1 | F2 | G1 | G2 |
| DECK U {Y X} | | | | | | | 1 | | | | | 2 | |
| DECK I {0,1,2,3,4} | 0-1 | 5-4 | 3 | 2 | 4 | 0 | 1 | 3 | 2 | 0 | 3 | 2 | 1 |
| DECK L {5,6,7,8,9} | 5-4 | 0-1 | 2 | 3 | 0 | 4 | 3 | 1 | 2 | 3 | 0 | 1 | 2 |
| Possible Combinations | 26 | 26 | 100 | 100 | 5 | 5 | 50 | 50 | 100 | 10 | 10 | 50 | 50 |
252    210 × 2 = 420    120
Total Combinations = 792
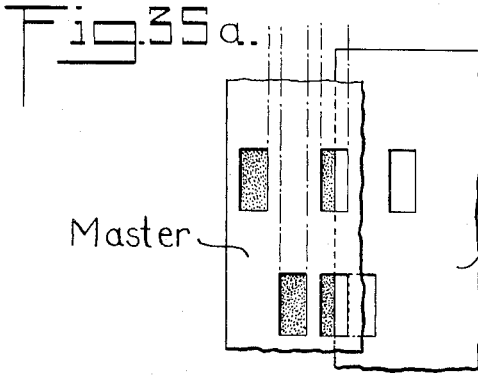
Fig.35a.
Master — Detail
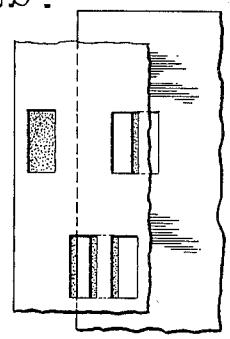
Fig.35b.
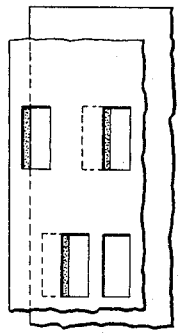
Fig.35c.
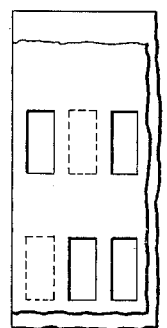
Fig.35d.
INVENTOR
HANS P. LUHN
BY
Charles E. McTiernan
ATTORNEY

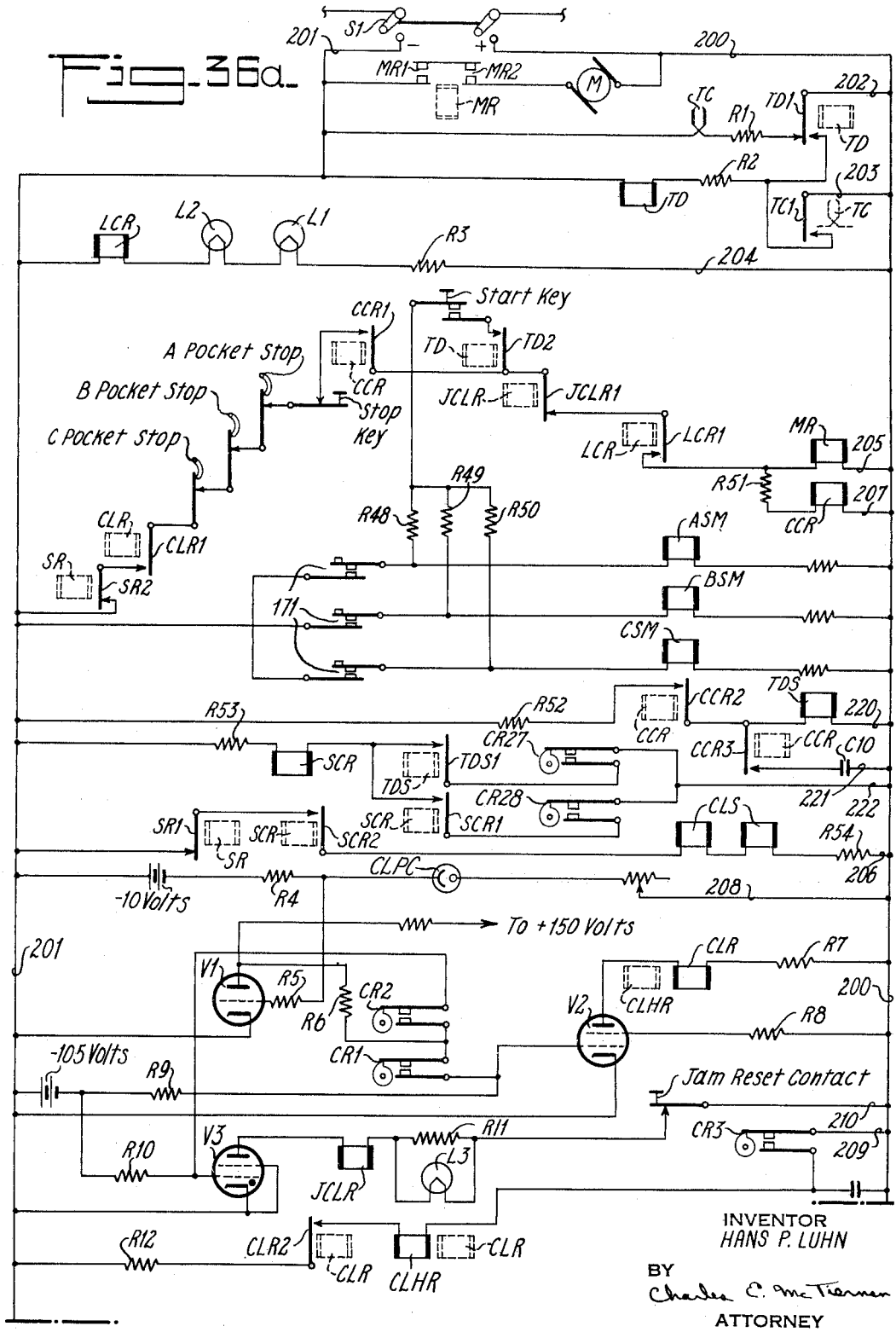

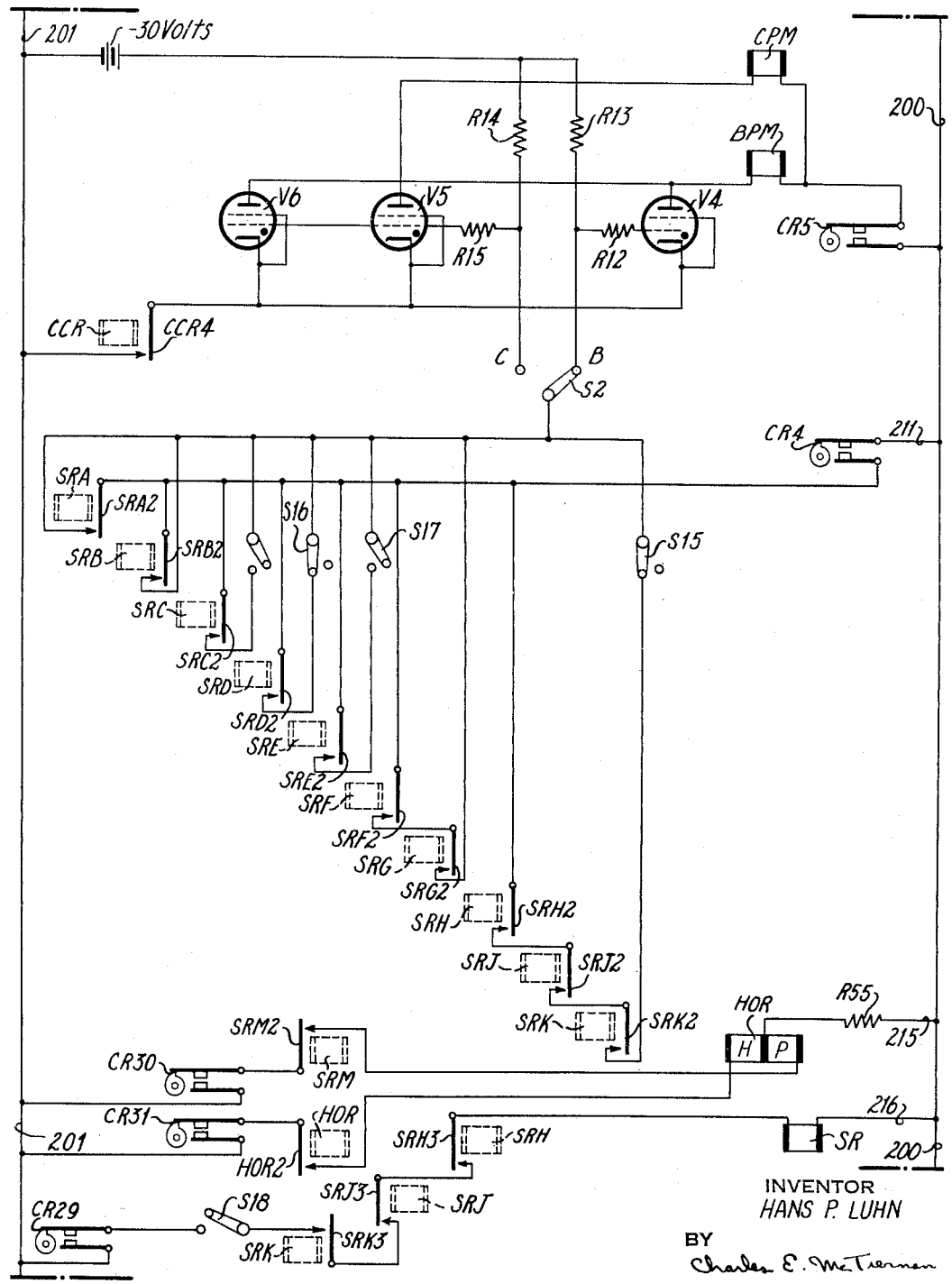

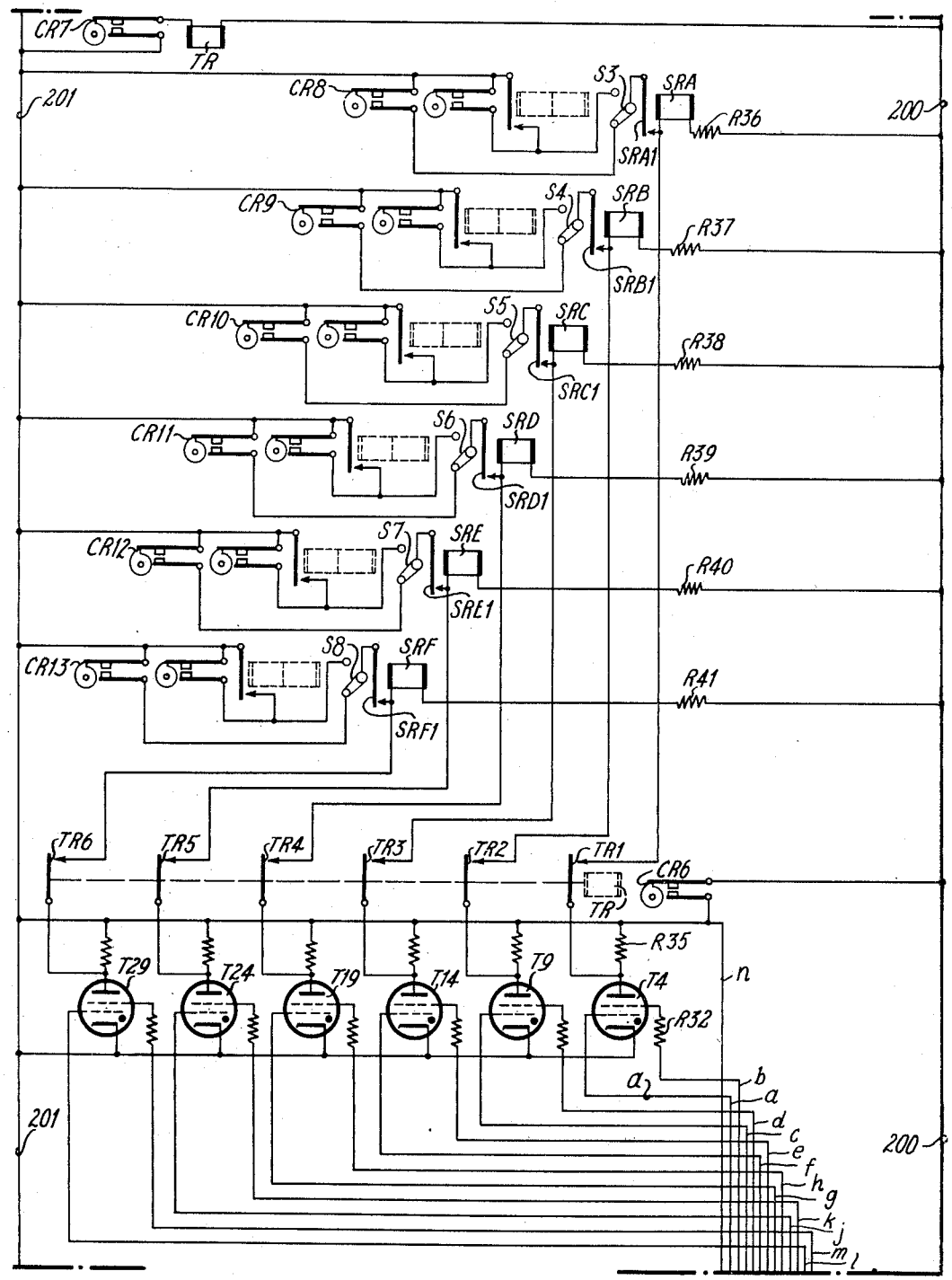

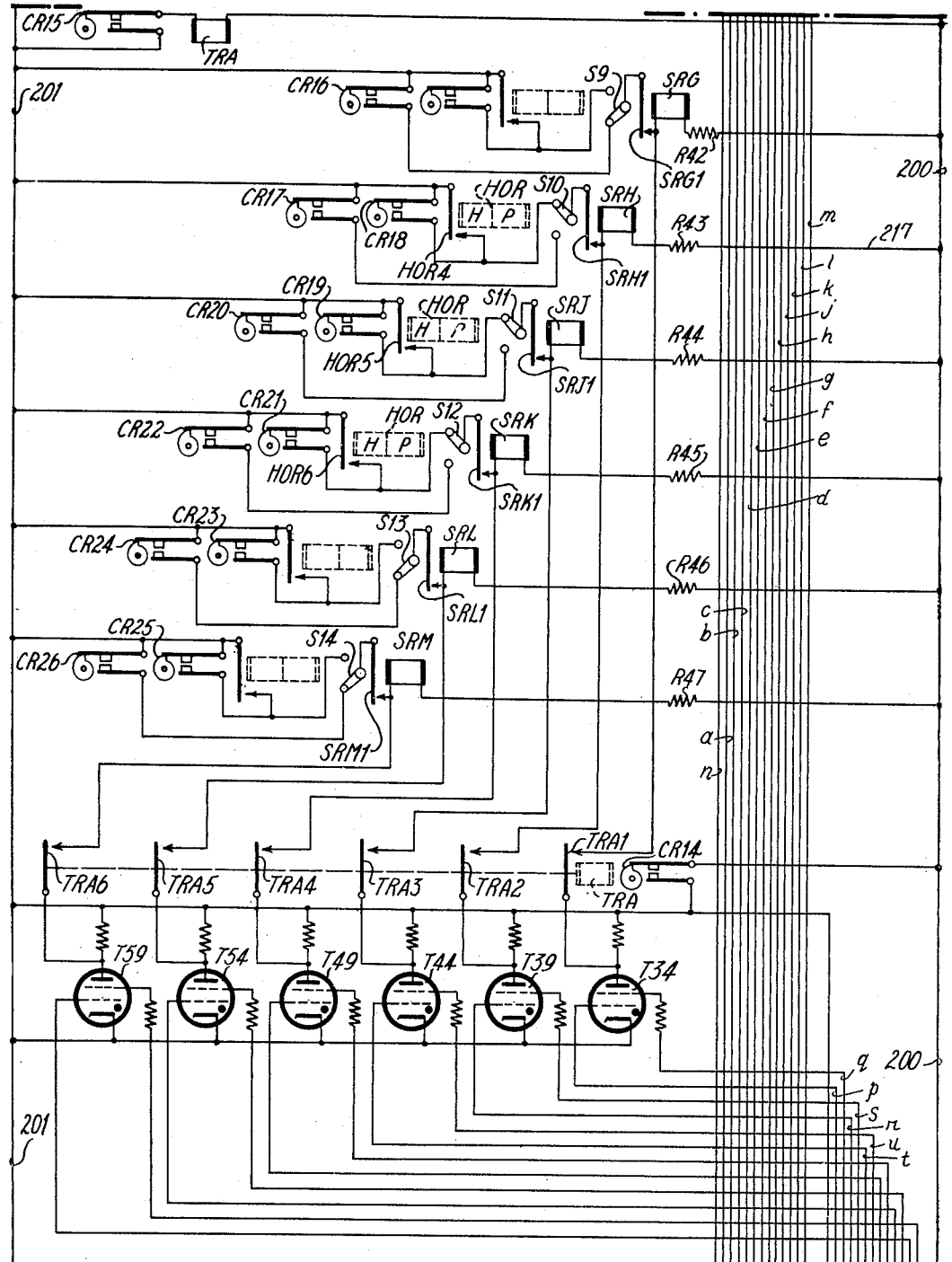

Oct. 11, 1955  H. P. LUHN  2,720,360
CARD SCANNING MECHANISM
Filed March 31, 1950  32 Sheets-Sheet 27

| QUESTION HOLES I DECK | 0 | 1 | 2 | 3 | 4 | 5 | 6 | 7 | 8 | 9 | ACCEPTANCE | REJECTION |
|---|---|---|---|---|---|---|---|---|---|---|---|---|
| 10 |   |   |   |   |   | 5 |   |   | 8 | 9 | 5 8 9 | 0 1 2 3 4 6 7 |
| 20 |   |   |   |   | 4 |   |   | 7 |   | 9 | 4 7 9 | 0 1 2 3 5 6 8 |
| 21 |   |   |   | 3 |   |   | 6 |   |   | 9 | 3 6 9 | 0 1 2 4 5 7 8 |
| 30 |   |   | 2 |   |   |   |   | 7 | 8 |   | 2 7 8 | 0 1 3 4 5 6 9 |
| 31 |   | 1 |   |   |   |   | 6 |   | 8 |   | 1 6 8 | 0 2 3 4 5 7 9 |
| 32 | 0 |   |   |   |   |   | 6 | 7 |   |   | 0 6 7 | 1 2 3 4 5 8 9 |
| 40 |   |   | 2 |   | 4 | 5 |   |   |   |   | 2 4 5 | 0 1 3 6 7 8 9 |
| 41 |   | 1 |   | 3 |   | 5 |   |   |   |   | 1 3 5 | 0 2 4 6 7 8 9 |
| 42 | 0 |   |   | 3 | 4 |   |   |   |   |   | 0 3 4 | 1 2 5 6 7 8 9 |
| 43 | 0 | 1 | 2 |   |   |   |   |   |   |   | 0 1 2 | 3 4 5 6 7 8 9 |

| QUESTION HOLES I DECK | 0 | 1 | 2 | 3 | 4 | 5 | 6 | 7 | 8 | 9 | ACCEPTANCE | REJECTION |
|---|---|---|---|---|---|---|---|---|---|---|---|---|
| 0 |   |   | 2 |   | 4 | 5 |   | 7 | 8 | 9 | 2 4 5 7 8 9 | 0 1 3 6 |
| 1 |   | 1 |   | 3 |   | 5 | 6 |   | 8 | 9 | 1 3 5 6 8 9 | 0 2 4 7 |
| 2 | 0 |   |   | 3 | 4 |   | 6 | 7 |   | 9 | 0 3 4 6 7 9 | 1 2 5 8 |
| 3 | 0 | 1 | 2 |   |   |   | 6 | 7 | 8 |   | 0 1 2 6 7 8 | 3 4 5 9 |
| 4 | 0 | 1 | 2 | 3 | 4 | 5 |   |   |   |   | 0 1 2 3 4 5 | 6 7 8 9 |

INVENTOR
HANS P. LUHN
BY
Charles E. McTiernan
ATTORNEY

Oct. 11, 1955  H. P. LUHN  2,720,360
CARD SCANNING MECHANISM
Filed March 31, 1950  32 Sheets-Sheet 28

Fig. 41.

CODING OF QUESTIONS FOR ANSWERS FALLING WITHIN A GIVEN RANGE (2/5 MAJOR SERIES)

| TO → / FROM ↓ | 0 | 1 | 2 | 3 | 4 | 5 | 6 | 7 | 8 | 9 |
|---|---|---|---|---|---|---|---|---|---|---|
| 0 | +432 | +432.431 | +43 | +43.421 | +42;43 | +4 | +4.321 | +4;32 -210.310 | -210 | + BLANK -4321 |
| 1 |  | +431 | +431.430 | +431.430.421 | +40.41 | +4.432 | +4.321.432 | +4.32 | -432.210 | -432 |
| 2 |  |  | +430 | +430.421 | +430.421.420 | +4.432.431 | +40.421.321 | +4.32.431 | -43.430.210 | -43.430 |
| 3 |  |  |  | +421 | +420.421 | +4.43 -3.210 | +4.43.321 | +4.3.310 | +3.4 | -43 |
| 4 |  |  |  |  | +420 | +420.410 | +420.410.321 | -4.10.420 | +3.4.421 | -43.421 |
| 5 |  |  |  |  |  | +410 | +410.321 | +410.321.320 -4.10 | -410.210.4 | -4.410 |
| 6 |  |  |  |  |  |  | +321 | +321.320 -4;10 | -4.210 | -4 |
| 7 |  |  |  |  |  |  |  | +320 | +320.310 | -4.321 |
| 8 |  |  |  |  |  |  |  |  | +310 | +310.210 |
| 9 |  |  |  |  |  |  |  |  |  | +210 |

+ = ACCEPT  − = REJECT  . = OR  ; = AND/OR

INVENTOR
HANS P. LUHN
BY
Charles C. McTiernan
ATTORNEY

Oct. 11, 1955   H. P. LUHN   2,720,360
CARD SCANNING MECHANISM
Filed March 31, 1950   32 Sheets-Sheet 29
  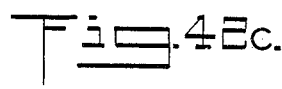
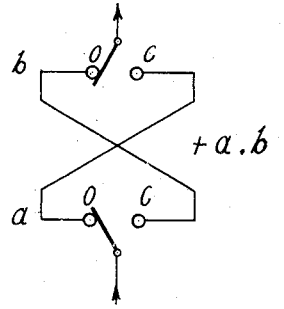
Fig.43a.
RANGE 49-73
| | VALUE | QUESTION | SYMBOLS |
|---|---|---|---|
| ACCEPT | 49 | +975.210 | +a |
| ACCEPT | 50-69 | +965.876 | +b.c |
| ACCEPT | 70-73 | +875.43 . 875.421 | +d.e |
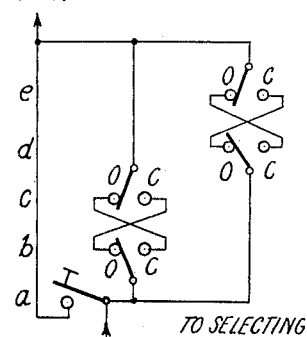
Fig.43b.
RANGE 14-58
| | VALUE | QUESTION | SYMBOLS |
|---|---|---|---|
| ACCEPT | 10-59 | +9.987 | +a.b |
| REJECT | 10-13 | -986.43 . 986.421 | -c.d |
| REJECT | 59 | -965.210 | -e |
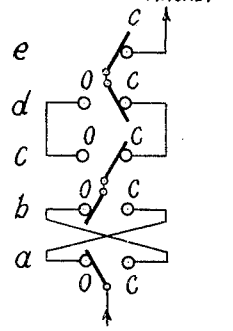
Fig.43c.
RANGE 11-89
| | VALUE | QUESTION | SYMBOLS |
|---|---|---|---|
| ACCEPT | 00-99 | + BLANK | +a |
| REJECT | OR 00-09 / 90-99 | -987.765 | -b.c |
| REJECT | 10 | -986.432 | -d |
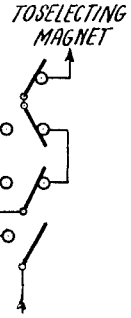
INVENTOR
HANS P. LUHN
BY
Charles E. McTiernan
ATTORNEY Oct. 11, 1955   H. P. LUHN   2,720,360
CARD SCANNING MECHANISM
Filed March 31, 1950   32 Sheets-Sheet 30
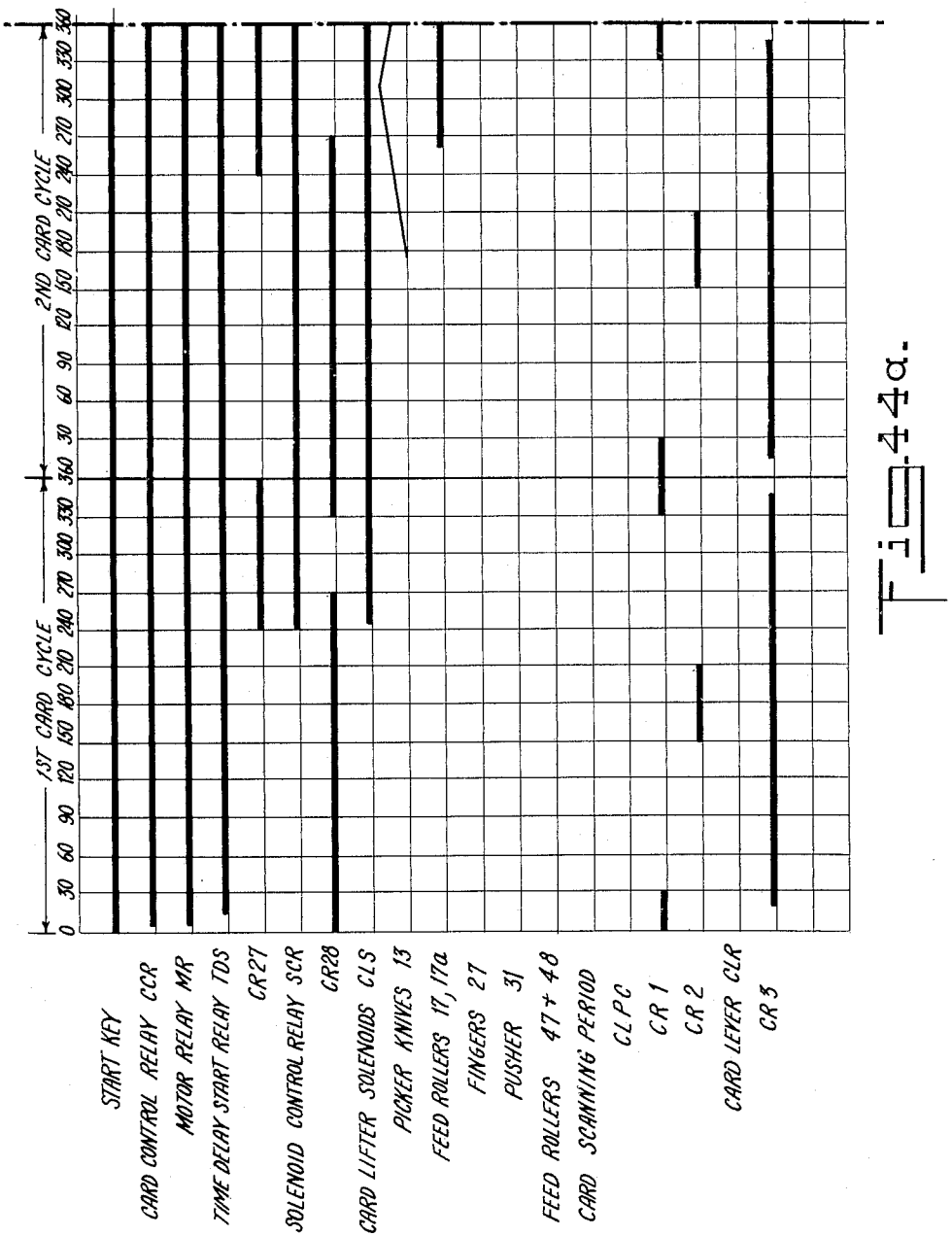
INVENTOR
HANS P. LUHN
BY
Charles E. McTiern
ATTORNEY

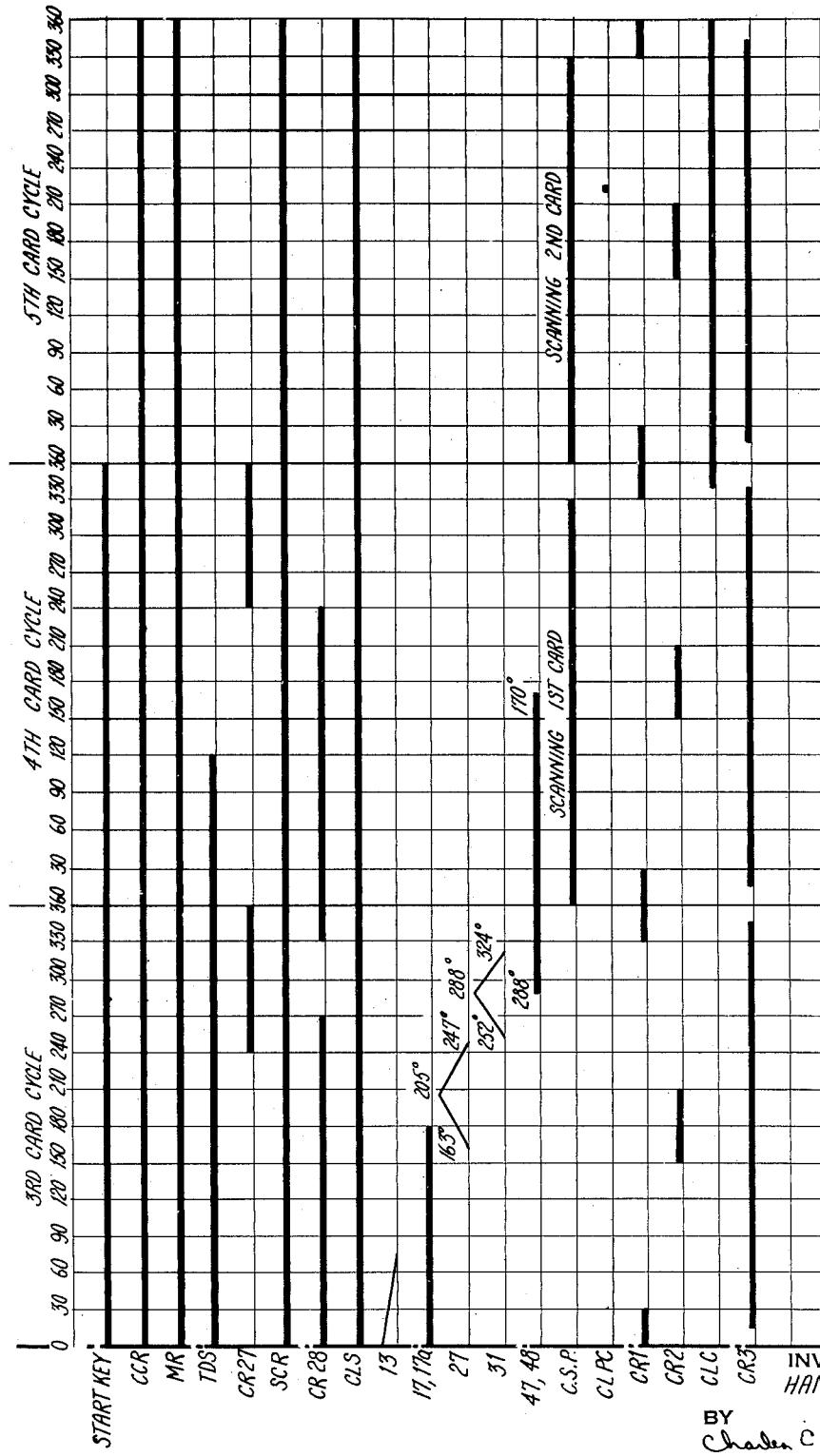

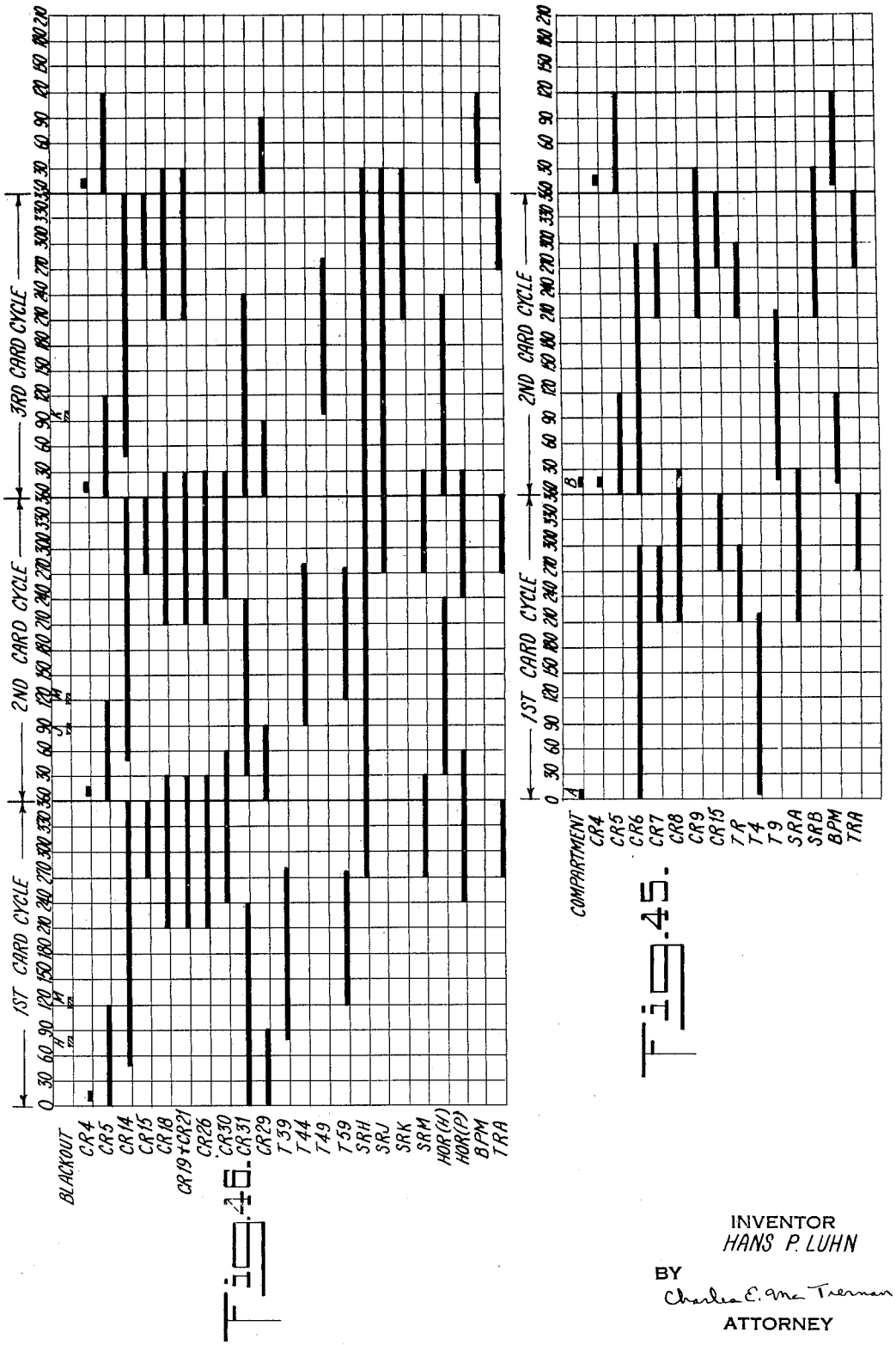

# United States Patent Office 2,720,360
Patented Oct. 11, 1955

2,720,360

CARD SCANNING MECHANISM

Hans P. Luhn, Armonk, N. Y., assignor to International Business Machines Corporation, New York, N. Y., a corporation of New York Application March 31, 1950, Serial No. 153,197

6 Claims. (Cl. 235—61.7)

This invention relates to a scanning machine wherein data bearing record cards are compared with a master card with the matched card or cards being deposited in a selected pocket of the machine.

The principal object of the invention is to provide a scanning machine having a photoelectric scanning device for analyzing perforated record cards with respect to a master card.

Another object of the invention is to provide a scanning machine having a light responsive element which detects the presence of a similar pattern of data within two superimposed data bearing cards.

A further object of the invention is to provide a scanning device whereby a plurality of columns of a perforated record card bearing codified information may be analyzed simultaneously with respect to a similar number of columns in a master or question card.

A still another object of the invention is to provide a photoelectric scanning device for searching for the presence of a plurality of recorded items and the sequence of occurrence thereof.

A still further object of the invention is to provide a card comparing system where the matching of a record or detail card with a master or question card is accomplished through the complementary punching of the master card.

A further object of the invention is to provide a scanning machine wherein the scanning of a detail card is performed in a column-by-column fashion.

A further object of the invention is to provide a scanning machine which is adapted to commence the scanning of a following detail card prior to the depositing of a scanned leading card in one of a plurality of card pockets of the machine.

A further object of the invention is to provide a scanning machine having additional light responsive means for checking for the presence of a detail card at one card cycle interval for the purpose of allowing the machine to continue in operation and for checking for the absence of said detail card at a second point within said card cycle for the purpose of stopping the machine in case a jam should occur.

A further object of the invention is to provide a scanning machine having means for decelerating the advancement of the already scanned detail cards for the purpose of reducing the impact of the cards against the side of the card pockets.

A further object of the invention is to provide a scanning machine where the direction of the detail cards being fed from the card hopper is changed such that the cards may be passed through the scanning device in a column-by-column fashion.

A further object of the invention is to provide a photoelectric scanning device having a plurality of compartments where each compartment is adapted to detect the presence of a matching condition over a field of four adjacent columns.

A further object of the invention is to provide a photoelectric scanning device having a plurality of analyzing compartments with each compartment having associated therewith a light responsive element which is cut off from a source of light whenever a matching condition occurs between a detail card and the complementary punched master or question card.

A further object of the invention is to provide a scanning machine which is adapted to detect the presence of correlated data which are punched over a plurality of successively following detail cards.

A further object of the invention is to provide a scanning machine which is adapted to detect the presence of those detail cards bearing a scale of values when the values come within a particular range of numbers as sought for by the master or question card.

In prior coding arrangements data are selectively represented in detail cards by punching the cards in various index positions according to a single point or combinational-point code. The usefulness of the single point code is obviously limited due to the minimum number of combinations possible in the well known IBM record card, provided with the usual eighty columns, each of which has twelve index point positions identified as Y, X, 0, 1, 2, 3, 4, 5, 6, 7, 8 and 9 perforated singly or in combination to represent various digits or other characters. The combinational code of the prior art is also limited in the number of coding representations as well as offering a coding arrangement which is difficult to adapt to alphabetical and numerical characters.

A further object of the invention is to provide a fixed hole coding arrangement which will greatly exceed the card receiving capacity of any coding arrangement of the prior art.

A further object of the invention is to provide a coding arrangement for representing within record cards upper case and lower case alphabetical characters and numerical characters as further modified by distinguishing symbols.

A further object of the invention is to provide a record card coding arrangement which is divided into three series where one series is used for the purpose of indexing, the second series is used to represent words, terms or expressions, while the third series is used to complete the intermediate portions of said words, terms or expressions.

A further object of the invention is to provide a record card coding arrangement having a fixed number of holes where said holes are distributed in various combinations among three decks of the record card.

A further object of the invention is to provide a record card coding arrangement which is capable of representing in a single column of a record card a two digit number as further modified by a distinguishing character with each digit recorded in a predetermined deck.

A further object of the invention is to provide a coding arrangement that is more suitable for interpretation, and will enable the recording of more data in a given number of card columns than has heretofore been accomplished.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a front elevation, partly broken away, of the complete machine.

Fig. 2 is a plan view, partly in section, of a portion of the machine.

Fig. 3 is a section on lines 3—3 of Figure 2.

Fig. 4 shows an isometric view of the card pusher mechanism.

Fig. 5 is a plan view, partly broken away, and partly in section, of the remaining portion of the machine.

Fig. 6 is a section on the line 6—6 of Fig. 5 showing the lateral registering mechanism.

Fig. 7 is a front view of a card pocket, partly in section.

Fig. 8 is an enlarged plan view, partly in section, of the clutching means for the lateral registering mechanism.

Figures 9 and 9a are schematic views showing the operation of the chute blades.

Fig. 10 is a section on line 10—10 of Fig. 5.

Fig. 11 is a section on line 11—11 of Fig. 2.

Fig. 12 is a section on line 12—12 of Fig. 2.

Fig. 15 shows a portion of an index chart.

Fig. 16 shows a portion of a detail card containing data complementarily punched in reference to the chart of Fig. 15.

Fig. 17 shows a portion of a master card which will match the detail card of Fig. 16.

Fig. 18 shows a portion of each of the superimposed master and detail cards.

Fig. 19 shows a portion of a detail card containing the various coding arrangements of the index series A1.

Fig. 20 shows a portion of a record card having punched therein the various coding arrangements of the index series A2.

Fig. 21 shows a portion of a record card containing the coding arrangements of the index series B1.

Fig. 22 shows a portion of a detail card having designations of the various coding arrangements of the index series B2.

Figs. 23, 24, 25, 26 and 27 respectively show a portion of a record card containing the various coding arrangements of the major series E, C1, C2, D1 and D2.

Figs. 28, 29, 30 and 31 each show a portion of a record card containing the various coding arrangements of the respective sub-series F1, F2, G1 and G2 of the minor series.

Figure 32:
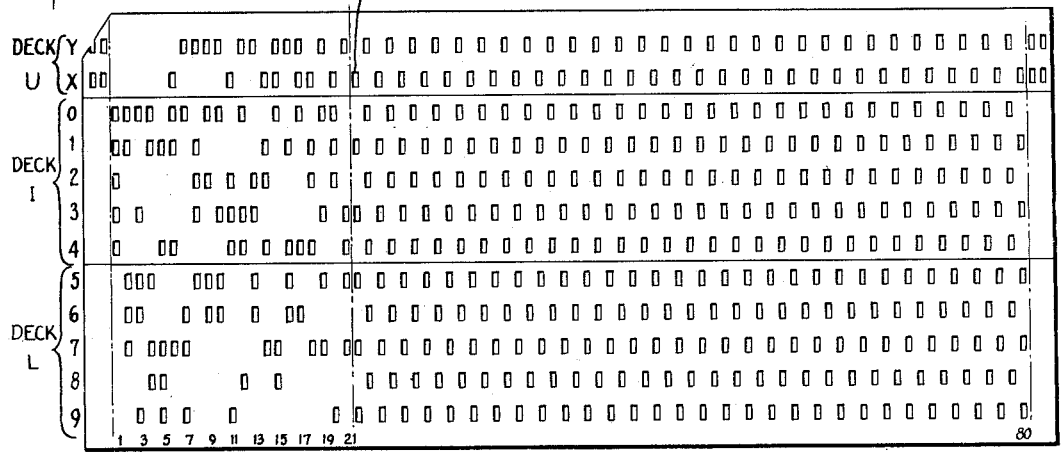

Fig. 32 shows a portion of a record or detail card containing data punched according to the coding arrangements of the index, major and minor series.

Figure 33:
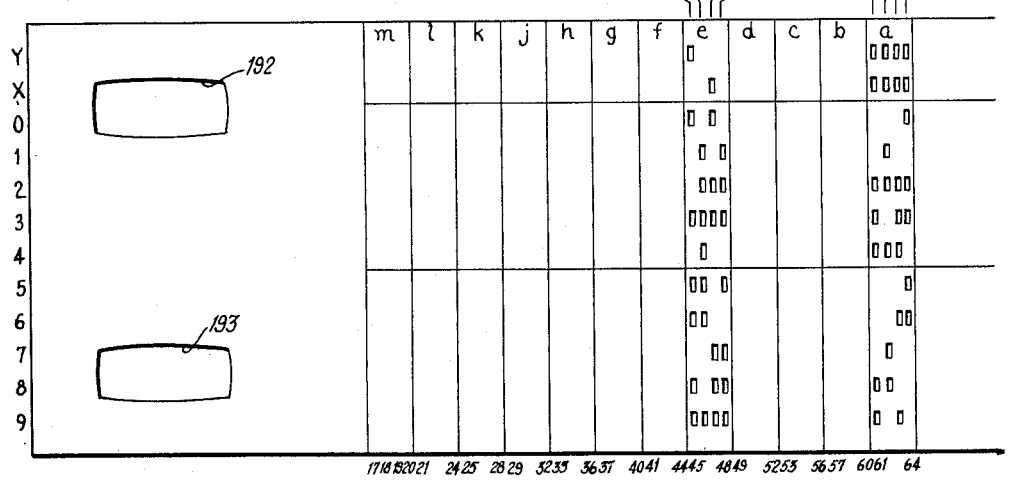

Fig. 33 shows the master card with which the detail cards are to be compared.

Fig. 34 is a table showing the total coding combinations possible from the new and novel code.

Figures 35a, 35b, 35c and 35d is a diagrammatic view showing the relationship between the detail card and the master card before and during a matching position.

Figure 36E:
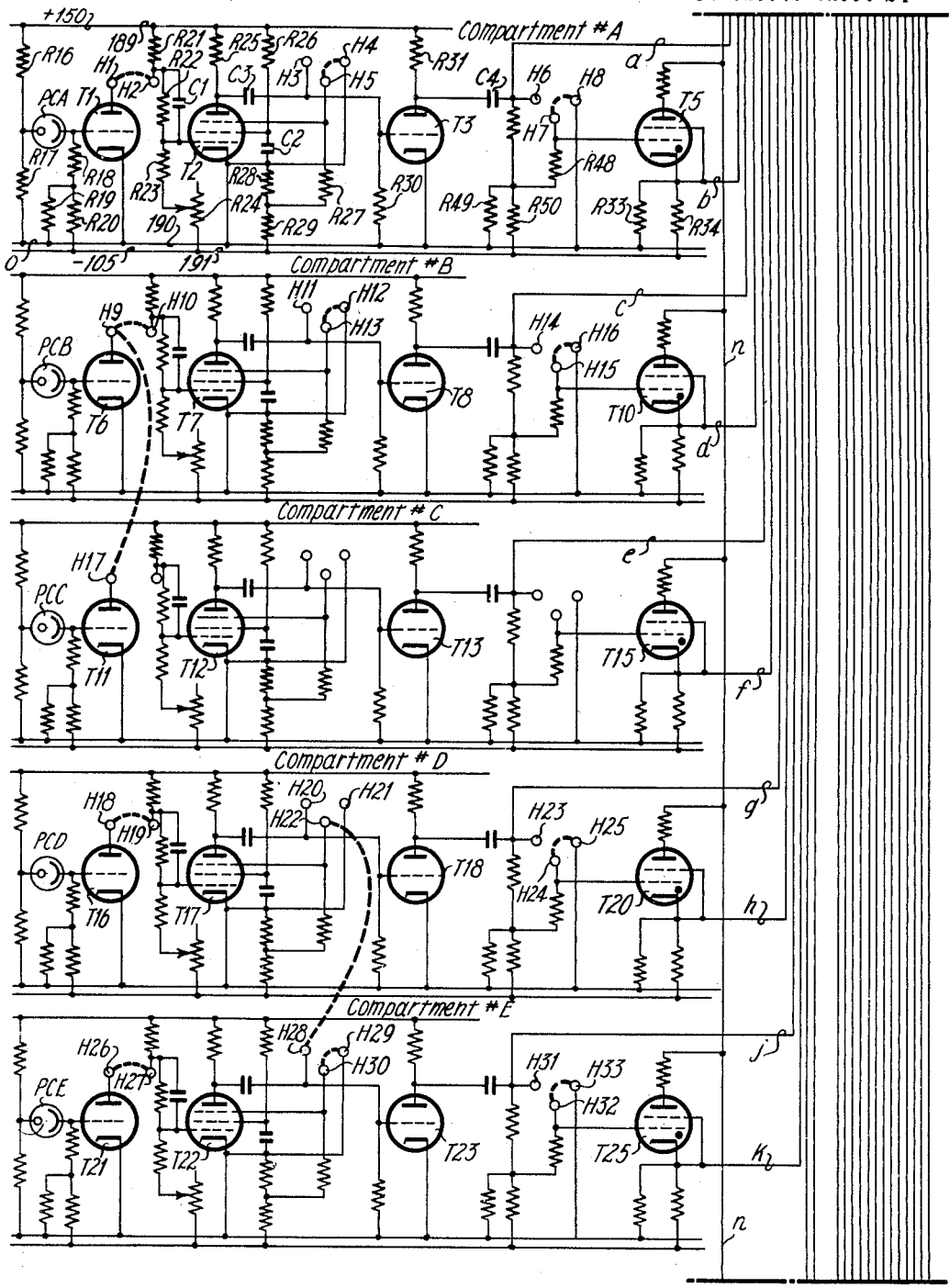
Figure 36F:
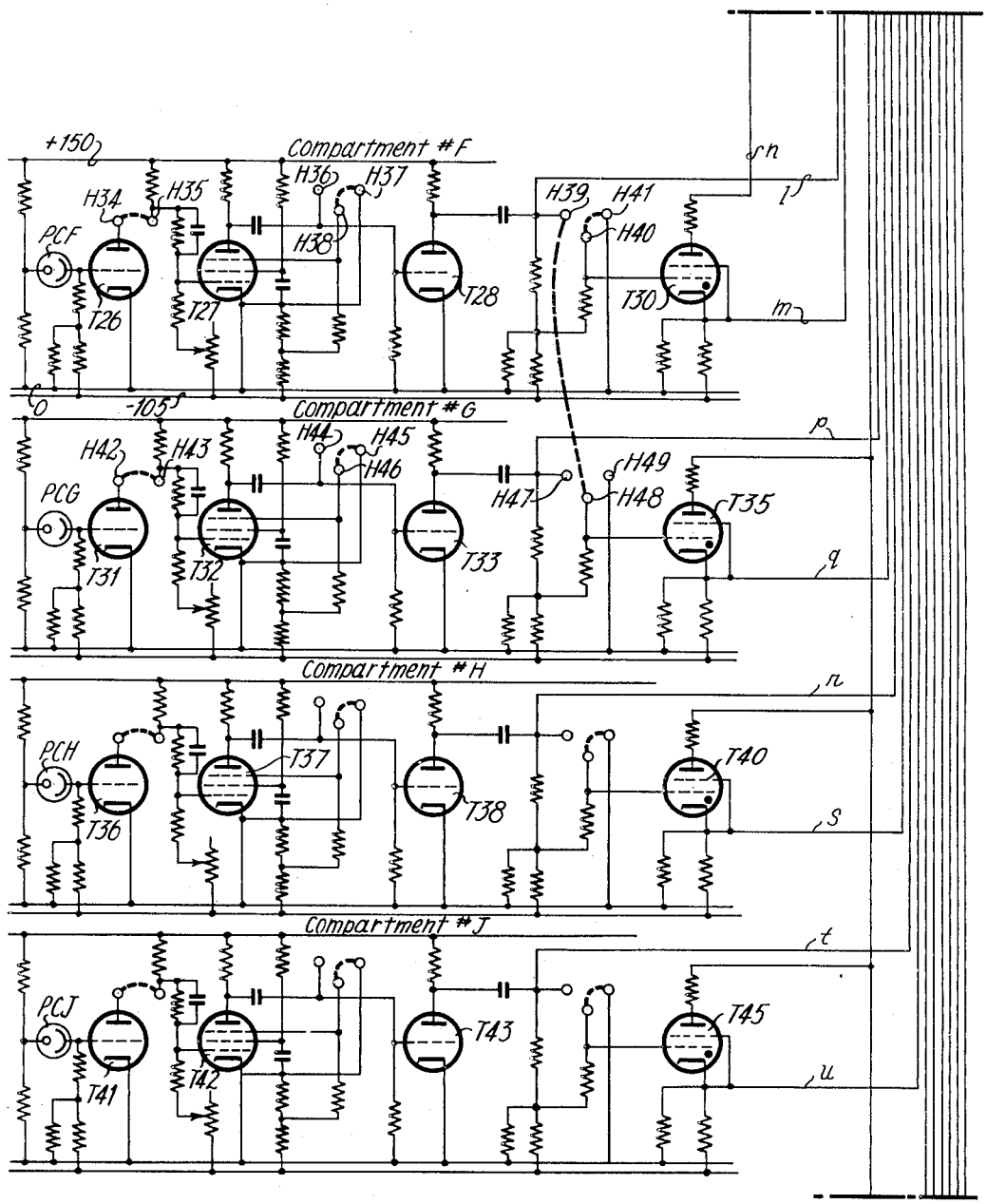
Figure 369:
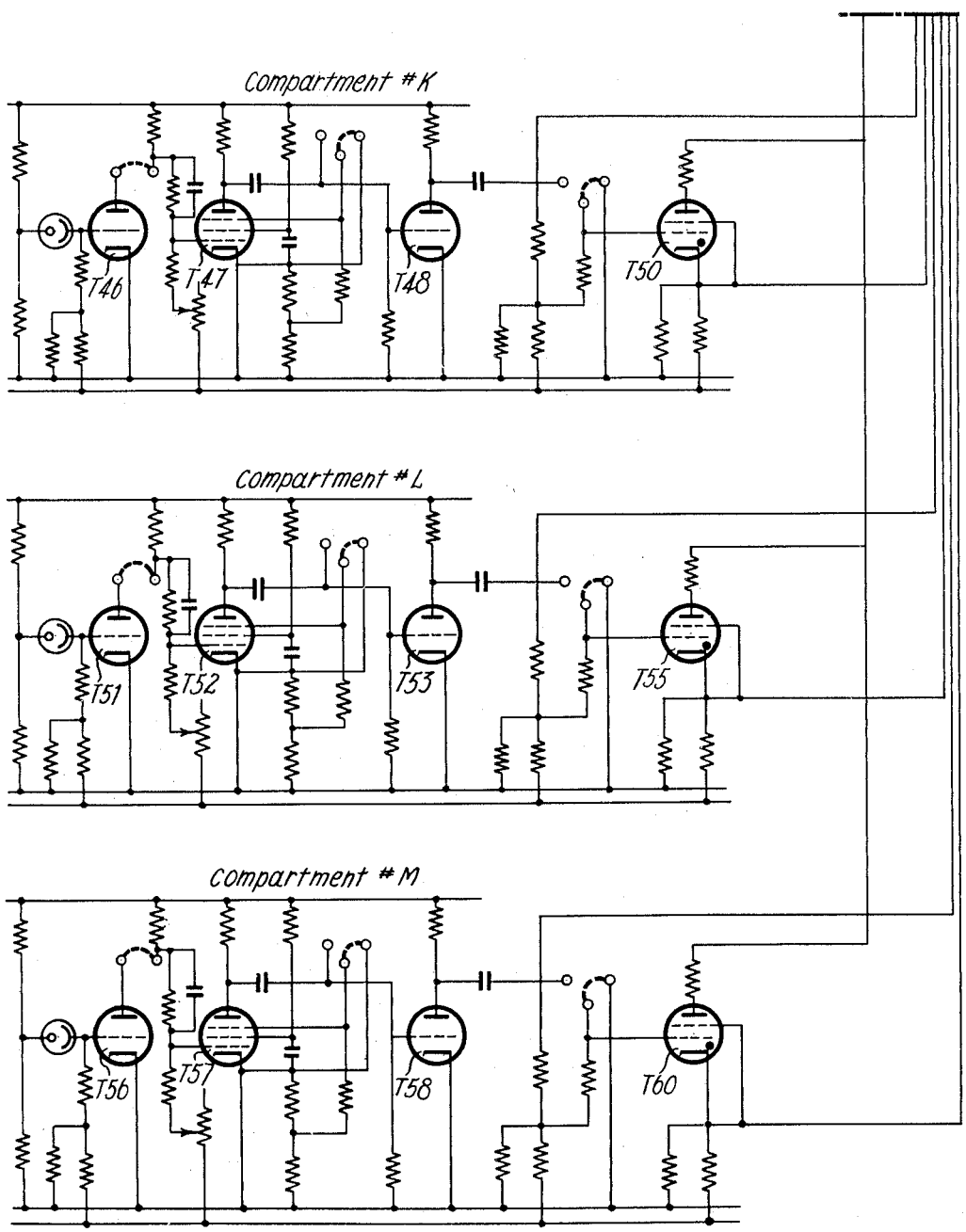

Figures 36a, 36b, 36c 36d, 36e, 36f and 36g placed in a vertical arrangement where Fig. 36a at the top and Fig. 36g is at the bottom constitute a wiring diagram of the electric circuits of the machine.

Fig. 37 is a view showing the disposition of the digits within two of the decks of a record card.

Fig. 38 shows a fragmentary portion of a plurality of record cards having superimposed thereon a complementary punched master card.

Figures 39, 40 and 41 show in table form the questions necessary to produce desired ranges.

Figs. 42a, 42b and 42c show diagrammatically the necessary relay connections to produce the desired results.

Figs. 43a, 43b and 43c show the necessary questions to produce a desired range as well as the relay connections to accomplish the results sought.

Figs. 44a and 44b together form a timing chart showing the machine being brought up to a running condition.

Fig. 45 is a timing chart showing a detail card being sensed in one cycle and selected in a second cycle.

Fig. 46 is a timing chart showing the operation of the hold-over circuit arrangement.

*General description*

A general description of the scanning machine will first be given of the various units which are integral parts of the machine and which shall be described in detail subsequently. A plurality of prepunched detail cards bearing codified information with the "9" edge leading are successively fed from the card feed hopper on the forward motion of a pair of picker knife slides into a pair of driven feed rollers. After clearing the feed rollers, a pusher mechanism causes the direction in which the cards are being moved to be changed 90° such that the cards may be moved through the scanning device in a column-by-column fashion.

In the scanning device each detail card is compared with a master card bearing the sought for information, in complementary form, which may be defined as the punching in the master card of all unwanted index point positions where the detail card is punched in the wanted index point positions. The scanning device compares the detail cards with the master card by means of a plurality of light responsive elements with each element arranged to detect a matching condition over a field of four columns. When a detail card favorably compares with the master card in one of the fields, the proper light responsive element is cut off from a source of light causing a relay to be energized through a circuit arrangement associated with said element and resulting in the matched detail card being eventually deposited in a selected card pocket.

*The record card*

In order that the invention described herein may be fully appreciated and understood a description of the novel coding arrangement employed therewith will first be described.

The record card in which statistical or other reference data are to be recorded, in accordance with the present invention, takes the form of the well known IBM machine controlling record card, which is provided as shown in Fig. 32 with the usual 80 vertical columns of punching or recording positions, each of which columns contains twelve so-called index point positions designated Y, X, 0, 1, 2, 3, 4, 5, 6, 7, 8, 9. For purposes of the present invention, the card is subdivided into three so-called decks, of which the upper deck U includes the Y and X positions, the intermediate deck I includes the 0 to 4 positions, and the lower deck L includes the remaining positions 5 to 9.

Data are recorded in the card columns by utilization of a code in which combinations of five holes distributed among the twelve possible recording positions in each column are grouped, to provide an arrangement that is more suitable for interpretation, and will enable the recording of more data in a given length of record card, i. e., a given number of card columns, than has heretofore been accomplished. This is effected by distributing the 792 possible five hole combinations in what may be designated as index, major and minor series, which are broadly distinguishable in that the index series contains no perforations in deck U; the major series contains a perforation in either the X or Y position in deck U; and the minor series has perforations in both the X and Y positions of deck U.

INDEX SERIES

The several five hole combinations included in the index series are represented in Figs. 19, 20, 21 and 22 from which, it will be noted, that this series is subdivided into what may be termed subseries A1, A2, B1 and B2.

*Index series A1.*—Referring particularly to Fig. 19, this subseries comprises five-hole combinations wherein four holes are grouped in deck L and the fifth hole lies in deck I, and also the special case where all five holes or designations lie in deck L. These different combinations of which there are twenty-six may have assigned to them designations such as indicated along the top edge of the record to identify them as, for example, lower case letters as further distinguished by an underscoring mark.

It will be noted that in this subseries the hole arrangement in the lower deck L with the exception of the arrangement of all five holes being in the L deck repeats for each successive group of five letters, and that the location of the hole in deck I will identify to which section of the alphabet the lower group relates.

It is to be noted that in Fig. 19 and other coding diagrams that the recording columns are spaced apart a greater distance than they would occur on the record card. This is done to enable easier identification of the combinations occurring in the various columns.

*Index series A2.*—In Fig. 20 are grouped all the five hole combinations wherein five or four of the positions occur in the intermediate deck I and the remaining designation occurs in deck L. This provides a group of 26 different characters to which may be assigned another set of characters as indicated along the upper edge of the record, and may relate to upper case letters of the alphabet accompanied by an underscoring mark.

A comparison of the coding in Figs. 19 and 20 will show the facility with which a designated character may be identified in the present arrangement. Taking any of the combinations illustrated, the absence of perforations in deck U, identifies it as being in the index series, the grouping of either four or five holes in a single one of the decks identifies it as an alphabetic character. The location of these four or five holes in deck I would identify it as an upper case letter, while if the four or five holes occur in deck L it would be identified as a lower case letter.

It is to be particularly noted that the distinction between the subseries A1 and A2 lies in the fact that there is a transposition of decks, i. e. deck L of Fig. 19 is the same as deck I in Fig. 20, and similarly deck I of Fig. 19 is the same as deck L of Fig. 20.

*Index series B1.*—In Fig. 21 it is shown how all the combinations, wherein three holes lie in deck L and two holes lie in deck I, are utilized to represent a hundred different things which for convenience are identified along the top edge of the record as 2-place numerals accompanied by an underscoring mark. In addition thereto, the two numerals are represented in a single column as a 2-place number with the tens digit identified by the three hole combination in deck L and the units digit by the 2 hole combination in deck I. This arrangement might be termed a combination within a combination in that the units digits within deck I are represented in the form of a two hole combination, that is, by perforations in various pairs of the possible five positions in this deck, while in deck L the tens digits are represented by perforations in three of the possible five hole locations.

*Index series B2.*—This series (Fig. 22) provides a further arrangement utilizing all the five hole combinations numbering 100, in which three of the five designations occur in deck I while the remaining two occur in deck L. Each combinational arrangement is identifiable as a 2-place number followed by the number sign #, the three hole combinations in deck I identify the tens digit of the 2-place numbers, while the two hole combinations in deck L identify the units digit.

Comparison between Figs. 21 and 22 shows the identity of deck L in Fig. 21 with deck I in Fig. 22 and also the identity between deck I in Fig. 21 and deck L in Fig. 22.

Considering the four subseries of this index series, its distinctive characteristics may be summarized as follows:

1. Absence of perforations in deck U identify it as the index series.

2. A group of four or five holes in either of the two lower fields identify it as an alphabetic series A1 or A2.

3. The location of the four hole group identify it as a lower case series A1 if occurring in deck L and as an upper case series A2 if occurring in deck I.

4. The grouping of the perforations with three in either of the two lower decks will identify the subseries as B1 or B2 and the three hole grouping will identify the tens digit of the 2-place number in both cases.

5. If the tens digit is in the lower deck L, it identifies the series B1 and if the tens digit occurs in deck I it identifies the series as B2.

It is to be particularly noted that the B1 and B2 series provide for recording two digits in a single column with each digit in a predetermined deck and with the units and tens digits distinguishable by their separate subcombinational characteristics within their related decks.

Referring to Fig. 32 in which a record card is shown with perforations in accordance with the coding described, inspection will show that columns 1 to 5 contain perforations made in accordance with the index series to represent A 00 43 20 97. Inspection will show that the letter A is identifiable as belonging to the A2 series and all the digits are related to the B1 series in accordance with the rules of identification set forth hereinabove.

MAJOR SERIES

Figs. 23, 24, 25, 26 and 27 illustrate the groupings of those five hole combinations that include a single hole in either the X or Y positions of deck U. The presence of an X hole identifies the character as one constituting the beginning of a word, term or expression, that is the beginning of a series of characters that are to be taken together to represent some value or quantity. The presence of a Y hole indicates that the combination represents the character within the word, term or expression. This may be made more clear after the coding arrangement for this series has been explained in detail.

*Major series E.*—This series (Fig. 23) comprises those five hole combinations in which one hole occurs in the deck U and two each in decks I and L. There are 100 such combinations including the X hole and another hundred including the Y hole, and in each set the designations are represented as 2-place numbers prefixed by a comma. The only difference is that, where the X index position is perforated, the combination represents the 2-place number and also represents that it is the first character of a word, term or expression. In the combination where the Y hole occurs, it represents a 2-place number and also that it is a part of the word, term or expression other than the first character or symbol thereof. In this series also the two digits of the number represented in any column comprise the units digit in deck I and the tens digit in deck L. The units digit is represented by a two hole combination within the five positions of deck I and the tens digit is represented by the identical two hole combination within the five holes of deck L, so that the tens digit is identified by its location in the lower deck and therein differs from the identification of the tens digit in the index series B1 and B2, where the tens digit is identified by virtue of its representation as a three hole combination in one of the lower decks.

*Major series C1.*—In this series (Fig. 24) are included all of the five hole combinations of which one hole occurs in deck U and the remaining four in deck I. Such combinations are identified as underscored numerals for superscript purposes.

*Major series C2.*—In this series (Fig. 25) are included all the five hole combinations, of which one hole occurs in deck U and the remaining four in deck L. Such combinations are identified as underscored numerals 5 to 9 for superscript purposes.

*Major series D1.*—In this series are grouped all the five hole combinations, wherein one hole occurs in each of the two upper decks and the remaining three occur in the lowermost deck L, and to each different combination there is assigned a character or symbol as indicated in Fig. 26 which includes numerals, lower case letters and the more common symbols occurring on the keys of well-known typewriters.

*Major series D2.*—Referring to Fig. 27, in this grouping are all the five hole combinations in which one hole occurs in deck U, one hole in deck L and the remaining three in deck I. This arrangement is the same as that of Fig. 26 with transposition of the decks I and L and with characters allocated to the different combinations as shown along the top margin of the record of Fig. 27.

Briefly reviewing the coding arrangement for this major series, its identity is determined as mentioned hereinabove by the presence of a hole in the X or Y position. The subseries C1 and C2 are readily identifiable by the four hole arrangement within decks I and L, respectively; the E series is identifiable by the split-up of the remaining four holes with two in each of the lower decks, and the D1 and D2 series are identifiable respectively by the presence of three-hole combinations in the lower and intermediate decks, respectively.

Referring to the record card (Fig. 32), the example shown therein indicates in column 6 of the card an X perforation identifying this as a start of a word or expression and constituting part of the five hole combination representing the upper case letter A. The designations in columns 7, 8, 9 and 10 of the card indicate that these characters are part of the expression beginning with the character identified in column 6 of the card, and examination will show that perforations in column 7 represent the numeral 6 of the subseries D1, the perforations in column 8 represent the subscript 3 from the subseries D2, the perforations in column 9 represent the identification ,01 from series E, and the perforations in column 10 represent the character ,03 also in the E series. In column 11 the combination again occurs with the X hole, indicating that this is the first character of another term or expression, and the combination corresponds to the character Z from series D2.

Column 12 has the Y hole indicating the continuity of the expression, and the 5-hole combination in this column represents the letter N also from the series D2.

MINOR SERIES

This series is identifiable as such by the presence of a hole or designation in both of the index point positions X and Y of the upper deck U, and this series is broken down into the four subseries designated F1, F2, G1, G2 whose combination arrangements are shown in Figs. 28 to 31.

Figure 28:
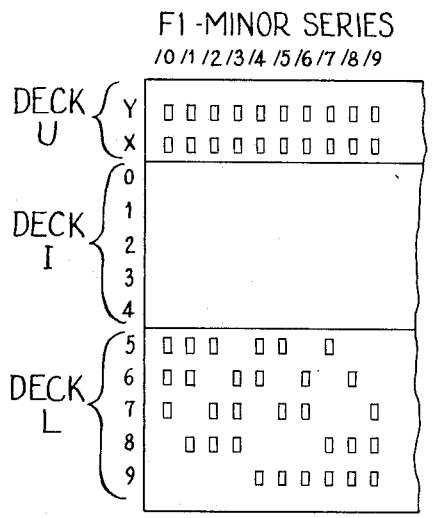
Figure 29:
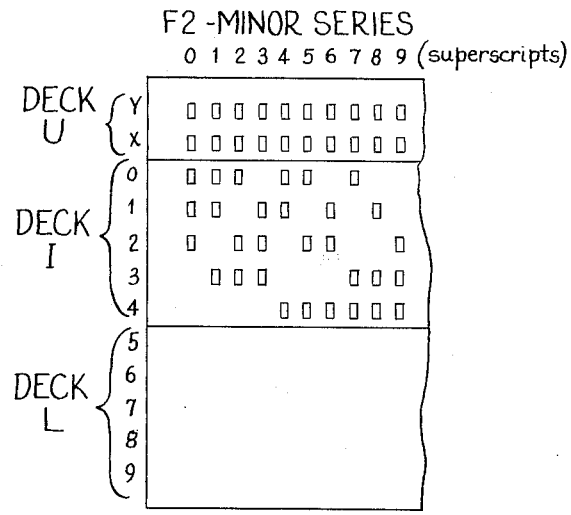
Figure 30:
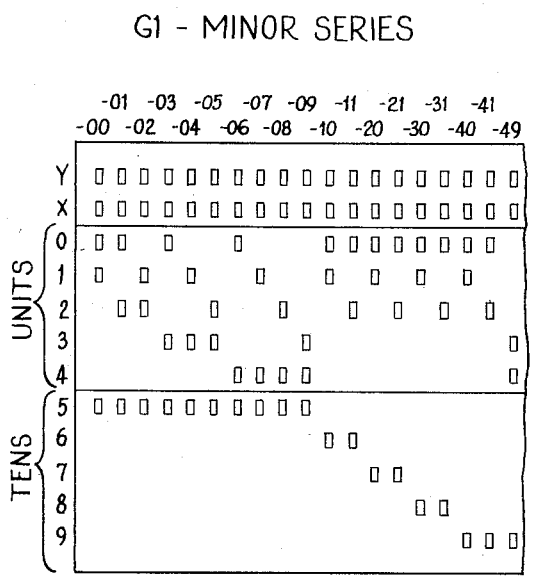
Figure 31:
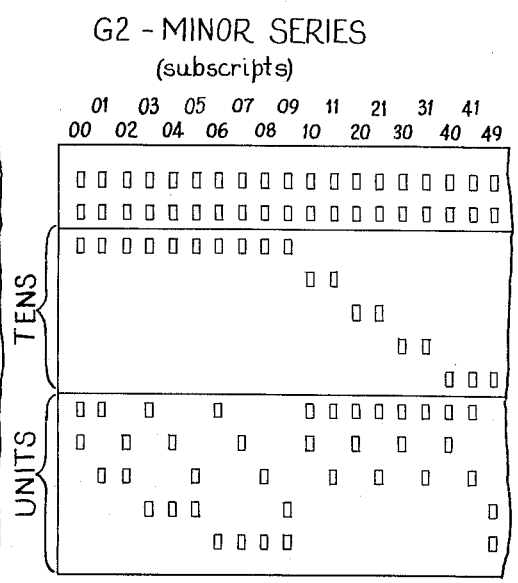

*Minor series F1.*—This series comprises those five hole combinations where three of the holes will occur in deck L in addition to the two holes in the U deck. There are ten of these and they are identified as the ten digits preceded by a diagonal as indicated in Fig. 28.

*Minor series F2.*—This grouping (Fig. 29) comprises those combinations where the three holes occur in deck I, and these are designated as digits 0 to 9 employed for superscript purposes.

*Minor series G1.*—In this series (Fig. 30) the three holes are arranged with two in deck I and one in deck L to provide 50 different combinations identifiable by 50 2-place numbers prefixed with a hyphen, of which the units digit is the two hole combination in deck I and the tens digit is the single hole in deck L.

*Minor series G2.*—Finally, the combinations of five holes in which the three holes not included in deck U are distributed with two in deck L and one in deck I to constitute 50 more combinations identified as 50 2-place numbers for subscript purposes. This G2 sub-series is the same as G1 with the decks I and L transposed, maintaining the units digits of the 2-place numbers identifiable by the two hole combination and the tens digit by the single hole.

Referring to Fig. 34, distribution of all the 792 five-hole combinations possible in a 12 position record column is briefly summarized to show ready identification of any particular combination. Thus, for example, the combination containing two holes in deck U, one hole in deck I and two in deck L constitutes a combination in the G2 subseries. The combination containing no holes in deck U, two holes in deck I and three in deck L constitutes the combination of the subseries B2 and so on.

Referring again to Fig. 32, it is noted that the perforations in column 14 constitute the first character of an expression as denoted by the presence of an X perforation while in column 15 are perforations identifiable as in the minor series G1, representing the subscript 05. The presence of the Y perforation in this combination also serves to identify this as part of the continuous expression commencing with the X hole in column 14 and continuing through to column 17 where another coding in the minor series identifiable as G1 indicates the value or reference —16. Column 18 represents the start of a new expression. The several columns of perforations are readily identifiable as to code and subcode in accordance with the detailed explanation given hereinabove.

The master card

The master card is shown in Fig. 33. This card is to be provided with perforations representing information to be searched for in a group of record cards and, after it has been perforated, it is placed in the scanning device of the machine where it is held while the record cards are moved across its surface in successive order, the movement being in the direction of the length of the cards.

For the purposes of the present invention, the master card has the same dimensional outline as the record cards and is provided with 12 fields, each comprising 4 columns, numbered from 17 to 64, as shown. A pair of openings 192 and 193 are provided to accommodate the card in its receiving position in the machine. Where particular data are to be searched for, a field of the master card is perforated to provide a complementary or inverse pattern of the punching as it would appear on the record card. This is illustrated in Fig. 33 where the first or right hand field is perforated to search for the value 00 43 20 97.

Comparison between perforations in this field and perforations in columns 2, 3, 4 and 5 of Fig. 32 will show this complementary or inverse punching relationship. Expressed in another manner, where an index point position in a column of the record card contains a perforation, the master card remains unperforated in such position, and conversely where an index point position in the record card is imperforate, the corresponding position in the master card contains a hole.

Assume now that the card of Fig. 32 is aligned vertically with the card of Fig. 33 and the record card is moved toward the left across the face of the master card. When columns 2, 3, 4 and 5 of the record card arrive in alignment with columns 61, 62, 63 and 64 of the master card, there will occur what is hereinafter termed a "blackout" condition, which will occur only when the two sets of four columns of the pair of cards are directly superimposed, so that in all index point positions in this field there is present an imperforate portion of either one or the other card.

As will be more fully explained in connection with the mechanical description, a light source is provided on one side of the superimposed cards and a light responsive device on the opposite side and, when the blackout condition occurs, the light is cut off from the light responsive device. This serves as an indication that the value set up on the master card has been discovered in the record card.

It is to be particularly noted that, as the successive columns of the record card pass across the perforated field in the master card, there will always be some position in the master card field where two holes are superimposed to permit passage of light as shown in Figures 35a, 35b, 35c and 35d. It is also to be particularly noted that the shorter dimension rectangular openings in both cards is greater than the horizontal spacing between the openings (Fig. 35b), so that as a column of holes in the detail card moves from one column of the master card to the next, the connecting strip between the perforating positions is not sufficiently wide to effect a blackout in the intermediate position. As long as there is no exact coincidence between the value perforated in the master card and the corresponding value in the record card, light will pass through, at some point or other, continuously.

It will be noted in connection with Figs. 32 and 33 that the location of the sought for data on the record card is immaterial. It may occupy any physical position along the length of the card, the only requirement being that the data, if it is, for example, the value chosen for illustration, must have the same relative arrangement of perforations within the four column range.

It will be noted in Fig. 32 that the left and right hand margins of the detail cards are punched in the Y and X positions. This distinguishing pattern in the U deck of the margins will not cause an unwanted blackout inasmuch as the pattern punched therein is the same as the U deck pattern for the Minor series which coding arrangement is never used alone but is always used in conjunction with the Major series.

In order to prevent further unwanted blackouts, unused columns of the detail cards are punched with six holes to each unused column commencing with the top hole of the first unused column being punched in the X position and thereafter alternating with the top hole being punched in the Y index point position.

It will be understood, of course, that the expression perforated in the master card may extend to more than the four columns in the example illustrated and may also contain fewer than four columns.

As will be explained in connection with the mechanism and the circuits, the twelve four column fields are each treated as individual searching or scanning units, whereby various searching conditions may be handled. For example, the master card may be handled. For example, the master card may be provided with perforations as indicated in the fifth field from the right which for a corresponding value in the record card, if superimposed thereon, will effect a blackout condition for the current responsive device related to that field. Similarly, any more or all of the twelve fields may contain value representing perforations (in complement form) and, if a blackout occurs in any one or more, will affect the related light responsive device. It will be apparent that, with the record card passing over the master card, such blackout may occur simultaneously in more than one field or may be successive in any order.

*Tabular coding arrangement*

A modification of the scanning code previously described is the tabular notation system of representation where a single concept is represented by the presence of a single hole within a column of a defined field in a detail card.

In this tabular notation arrangement, the table as punched in a detail card represents a plurality of characterstics in accordance with a prearranged key or table index where each characteristic is represented in the card by the presence of a single hole. To punch a table of this sort, the indexer will refer to a table index chart which will list a multitude of characteristics in column and index point position form of a standard record card in order to determine the position that the wanted characteristics should be punched in a detail card.

In Fig. 15 there is a table index chart, identified as Table 97#, listing the states and two of the possessions of the United States which comprise possible locations of branch offices of a particular business organization. The position of each state or possession in the chart corresponds to a particular column and index position within a record card.

Now let it be assumed that the business organization concerned has branch offices in the States of California, Florida, Idaho, Iowa, Maine, Missouri, New York, North Carolina, Ohio, Pennsylvania, Rhode Island and South Carolina and that it is desired that these locations be punched in a detail card. The indexer on observing that California occupies the 3 index position in column 1 of the chart of Fig. 15 would indicate that state in the detail card by punching all unwanted positions but the wanted position 3 as shown in Fig. 16. In like manner the remaining branch offices would be punched in the detail card. It should be noted from Fig. 16 that the coding arrangement of the tabular notation system deviates from the previously described rule that there be a fixed number of holes in each column of the detail card. In fact in this tabular notation system the number of holes in each column of the detail card is limited only by the number of index positions in a card. The geographical locations of branch offices of other business organizations would be punched in a similar manner in separate cards.

In order that the tabular notation system of coding be differentiated from the coding notations for terms or expressions, as previously described, it is necessary that the U deck of the detail card of Fig. 16 have punched therein a distinguishing pattern different from that pattern which will indicate the presence of a term or expression. The distinguishing pattern of the U deck which sets aside the tabular notation coding system from the other coding arrangements is that the first column of the table proper is punched with at least a hole in the Y position followed by holes in the X and Y position of the remaining columns of the table. When only the Y position of the first column of the table is punched as in Fig. 16 it signifies that during the scanning operation a matching condition will be detected when the photocells of the individual compartments are blocked off from the source of light.

In transferring the data from the index chart to the detail card it is also necessary to punch the chart index number within the detail card. The index number of the chart of Fig. 16 is 97# which is punched in the detail card by resorting to the code representation of the subseries B2 of the Index series (see Fig. 22).

When a search is to be made to select all those organizations having branch offices in California, Iowa, Missouri and Rhode Island, the indexer by referring to the index chart of Fig. 15 would observe the position of these states and then punch the master card in the corresponding positions as shown in Fig. 17. The master card in the index column and the U deck is punched complementary to that hole pattern of the detail card. With regard to the hole pattern of the U deck of the master card, it is pointed out since this tabular coding arrangement permits the creation of several classes of tables as distinguished by the number of columns occupied that the master card must contain a perforation in the Y position of the next following column to the right of the table proper so as to produce a mismatch except when the number of table columns agree. In the table proper it is not necessary that the master card be punched in all positions inasmuch as the condition of the master card in the index column and the U deck are ample safeguards against accidental matching of other questions.

Since each compartment is adapted to indicate the results of the comparison between the master card and the detail cards over a field of four columns in width, it will be necessary in the case of the detail card of Fig. 16 and the master card of Fig. 17 to intercouple two compartments to operate as a unit where one of the compartments will compare the index column and columns 1, 2 and 3 of the detail card with the corresponding columns of the master card which the other compartment will compare columns 4, 5 and 6 of the detail card with the corresponding columns of the master card.

The master card of Fig. 17 upon being compared with the detail card of Fig. 16 will cause the photocells of the compartments concerned to be blocked off thereby indicating a matching condition and causing the card to be deposited in the selected card pocket. A matching between the detail card and master card will only exist when the master card favorably compares with the detail card as far as the four states sought for are concerned.

If the information sought for is whether an organization has a branch office in any one of the four states mentioned above then the master card can be punched in a fashion to ask four different questions where each question would be assigned to two compartments and be directed toward the seeking of a response from only one of the four states. Two compartments would be necessary for each question in this situation since a compartment can detect the matching condition of only four columns and there would be seven columns for each question. Each pair of compartments would be intercoupled with the remaining pairs of compartments such that a response in any one of the pairs would result in the matching card being deposited in a selected card pocket as shall be explained subsequently.

In the tabular coding arrangement, when the U deck of the detail card has a hole punched in the Y position of the first column of the table proper it signifies that a matching condition will be indicated whenever a blackout of the photocell concerned occurs. When the U deck of the detail card has a hole punched in the X and Y position of the first column of the table proper it indicates that a matching condition will be encountered whenever the photocell concerned is not blocked off from the light source.

In Fig. 18 there is shown in exaggerated diagrammatic form a detail card having superimposed thereon a master card. The holes punched in the detail card are represented by the solid rectangles while the holes punched in the master card are represented by the open rectangles.

The data punched in the detail card represents the same data punched in the detail card of Fig. 16. The twelve states which are represented in Fig. 16 by complementary punching are represented in the detail card of Fig. 18 by punching each state in a position corresponding to the index position of the state in the chart of Fig. 15.

The information sought for from the detail card of Fig. 18 is the same as that sought for from the detail card of Fig. 16 and the questions seeking such data are punched in the master card by punching the corresponding position that the four states occupy in the index table of Fig. 15. Thus the four question holes of the master card that are directed toward the table proper will overlap the corresponding holes in the detail card thereby permitting the source of light to impinge upon the proper photocell and indicating a matching condition.

While the columns of the table proper operate upon the principle that whenever a light is impinging upon the photocell associated with that portion of the master card directed towards the table proper a matching condition occurs, the index column and the column following the last column of the table still operate upon the principle that a matching condition occurs only when the photocell associated with each of said columns is blocked out.

Thus it is to be noted that in order to detect the presence of the card of Fig. 18 that at least four intercoupled photocell compartments are required where one compartment would indicate the results of the comparing of the index columns of the master and detail cards, the next two compartments would indicate the results of comparing the table proper while the fourth compartment would indicate the comparing of column 6 of the master and detail cards. Thus it is to be noted a matching will be deposited in the proper card pocket only when the photocells associated with compartments 1 and 4 (Fig. 18) are blocked off at the time that the photocells of compartments 2 and 3 are in an unblocked condition.

Likewise, with regard to Fig. 18, it should be noted that a matching condition will exist if one or several or all of the wanted states are present in the detail card.

Card feeding mechanism

Figure 1 shows the general mechanical structure and arrangement of the parts of the scanning machine for carrying out the invention. The scanning machine has a motor M, which through the belt 1 and the pulley 2 drives the main shaft 3. The shaft 3 is geared through a set of miter gears 4 (Fig. 2) at a ratio of 1:1 to the auxiliary shaft 5 which, in turn, by means of a set of spiral gears 6 rotates the shaft 7. A crank disc 8, Figure 11, which is secured to the shaft 7, carries an eccentric crank pin 9 to which the connecting rod 10 is connected at one end thereof. The other end of the rod 10 is pivotally secured at 10a to the arm 11 such that the arm 11 will oscillate on its associated pivot shaft 12 (which is secured to the frame of the machine) upon motion being imparted to the rod 10. This oscillating motion of the arm 11 is transmitted to a pair of picker knife slides 13 and 13a through a slot 14 and pin 15 arrangement such that on a forward stroke of the picker the bottom record card of those cards contained within the card feed hopper will be fed from the hopper 16 to the feed rollers 17 and 17a.

Freely pivoted on shaft 12 at each end thereof are the arms 66 with only one of such arms being shown as in Fig. 11. There is connected to each of the arms intermediate the ends thereof a connecting member 67 which couples the arms 66 with the respective plungers 68 of the two card lifting solenoids CLS (Fig. 1). The free ends of the arms 66 are biased in an upwardly direction by the springs 69. There is connecting the free ends of the arms 66 a cross member 70 which supports a plurality of card lifting bars 71 as shown in Fig. 1. The card lifting bars 71 operate to keep the cards out of the path of the picker knife slides 13 and 13a when the scanning machine is not in operation. When the machine is rendered operable, the solenoids are energized causing the plungers 68 to be moved in a downward direction so as to overcome the biasing effect of the spring 69 and to cause the bars 71 to drop, thereby permitting the bottom card to fall in the path of the picker knife slides 13 and 13a.

The rollers 17 and 17a each comprise an upper and lower set of rollers where the upper rollers thereof are secured to the shaft 18 (Fig. 11) while the lower rollers of 17 and 17a are secured to the shaft 19. The shafts 18 and 19 are driven continuously by the shaft 5 through a set of spiral gears 20 (Fig. 2).

As the card is advanced past the feed rollers 17 and 17a and the step 21 (Fig. 11), the fingers 22 (Fig. 14), of which there are four in number, with each being pivoted on a stud 23, are biased in a clockwise fashion by the springs 24 (Fig. 11) against the stops 75 for the purpose of depressing the card being fed, into a position below the guide plate 25.

The fingers 22 are pivotally mounted upon the block 72 which is fastened to one side of the frame of the machine by the studs 73. A bracket 74 to which is attached one end of the biasing spring 24 is fixed to the other side of the frame of the machine by the studs 73.

In order to insure the advance of the card to a stop rail 26 after it has left the control of the feed rollers 17 and 17a there is provided a spring blade finger 27 (Fig. 11) which is fastened to the member 28 which, in turn, is secured to and rotating with the shaft 19. This spring blade finger 27 rests normally against the stop 29 which is also fastened to and rotating with the shaft 19. The movement of the finger 27 is synchronized with the card feed operation in such a manner that it contacts the trailing edge of the card just prior to the time that the card passes from the control of the rollers 17 and 17a as shown in the timing diagram of Fig. 44b. From the instant that the finger 27 contacts the trailing edge of the card the finger will push the card past the step 21 until prevented from doing so due to the interference with the edge 31 of the base plate 30. After the card passes the step 21 the fingers 22 depress and hold the trailing edge behind the step to insure that the next following card will pass over the top of the preceding card. As a result and because of the continuing rotation of the shaft 19, the blade 27 becomes flexed until it eventually clears and slides by the edge 31 of the base plate 30. This latter action causes the removal of the tips of the blades 27 from the card line thus permitting the next card to advance.

Fastened to the plate 25 is a handle 76 which permits the plate to be moved about the pivot point 77 (Fig. 3) to permit access to a card in this position, if desired.

Since it is intended to feed the record cards past the scanning device in a column-by-column manner, it becomes necessary to change the direction of the card motion by 90° with respect to the original direction thereof. For this purpose there is provided a pusher mechanism which is shown in Figures 2, 3 and 4.

The pusher mechanism comprises a finger 31 having a pair of offsets 31a and 31b at the lower portion thereof which are movably coupled to the pin 32 at 32a and 32b respectively and a U-shaped rocking member 33 having a pair of legs 33a and 33b where the member 33 is pivotable about the shaft 34. The leg 33a of the member 33 is a double arm lever with one arm of the lever being movably coupled to the pin 32 at 32a with the free end of the leg 33b also being movably coupled to the pin 32 at 32b.

A connecting link 35 which comprises a pair of parallel members is fastened at one end thereof to the other arm of the leg 33a at the pivot point 35b. While the other end of the link 35 has secured thereto a roller 36, which, due to the bias action of the spring 37, is made to follow the cam 38 which is being driven by the shaft 39. An idling arm 40 which is pivoted on the pin 41 fastened to the machine is carried by the link 35 at the pivot point 35a.

The shaft 39 has secured thereto a spiral gear 77 (Fig. 11), which meshes with the spiral gear 43 of the shaft 3, thereby enabling the shaft 39 to be driven at a rate of speed of one revolution for each card cycle. As the shaft 39 rotates, the finger 31 in cooperation with the cam 38 and through the connection of the link 35 with the finger 31 is made to move up and down sufficient to engage the edge of the card or to clear it.

The pusher finger 31 has also attached thereto at 44a a connecting link 44 which is similar to the link 35. The link 44 has secured to the free end thereof a roller 45 which is also urged by the spring 37 to follow the cam 46 which is attached to the shaft 39 while also carrying an idling arm 78 (Fig. 11) which is similar to that idling arm carried by the link 35 and which is similarly attached to the machine as in the case of the link 40. The riding of the roller 45 upon a surface of the cam 46 during the rotation thereof causes a transverse movement of the finger 31 thereby forcing the card to be moved in a new direction. It should be noted that the combined action of the two cams 38 and 46 in conjunction with the movement of the links 35 and 44 is such that as soon as the pusher 31 has moved the card into the feed rollers 47 and 48 the extreme end of the pusher 31 is drawn below the card line as it returns to the initial position thereof so as to be out of the path of the next following card and after clearing it, it is raised again to a position to push the next card in the direction of the scanning device.

Figure 14:
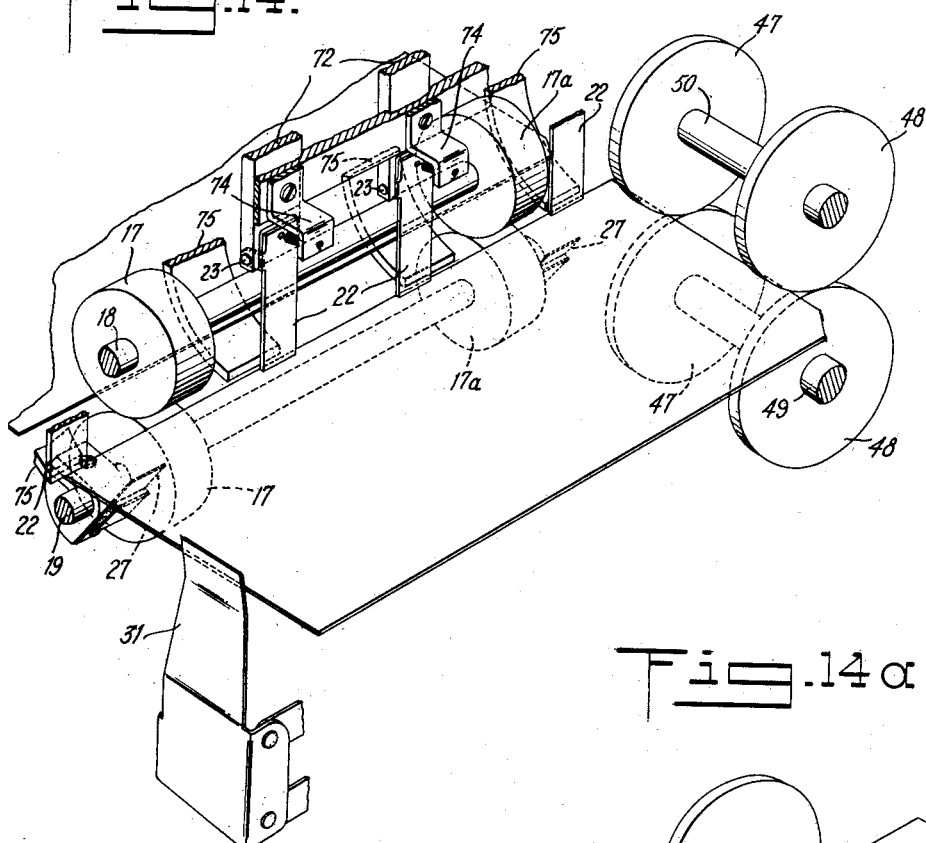
Figs. 14 and 14a are fragmentary views showing the relationship between successive cards during the interval that the cards are being advanced in a new direction.
Figure 14A:
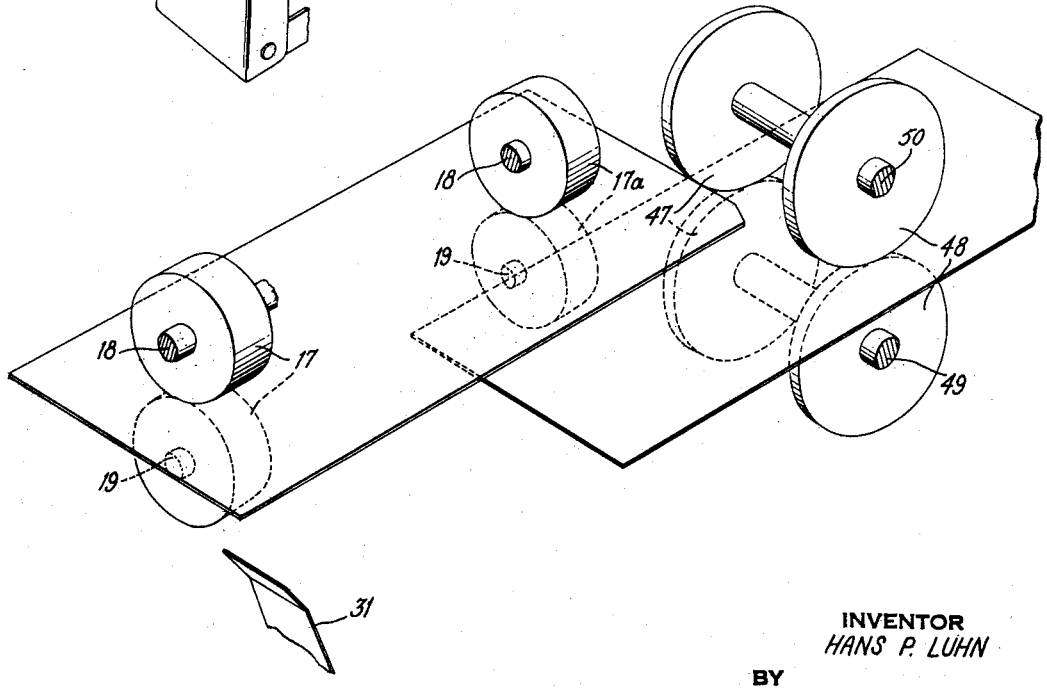
Figure 23:
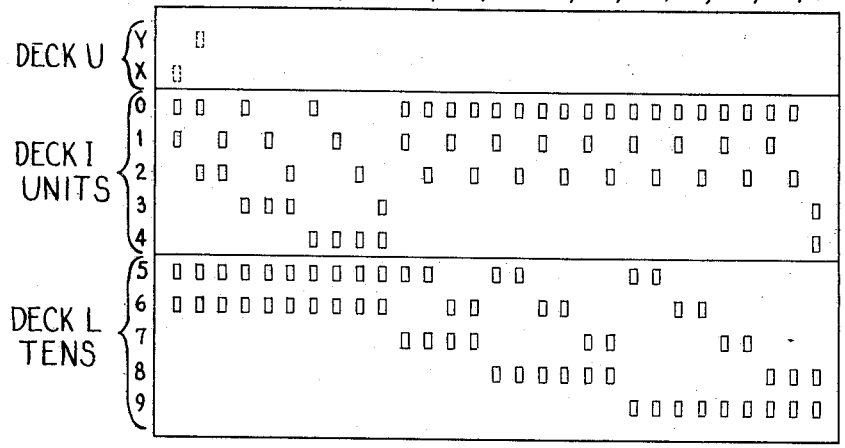
Figure 24:
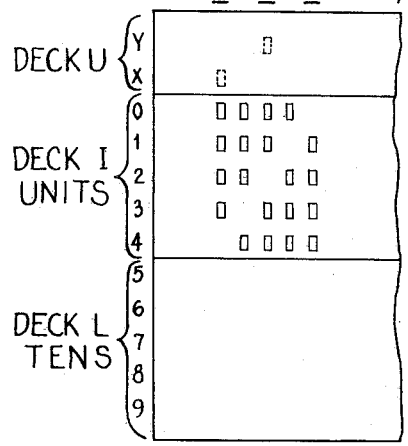
Figure 25:
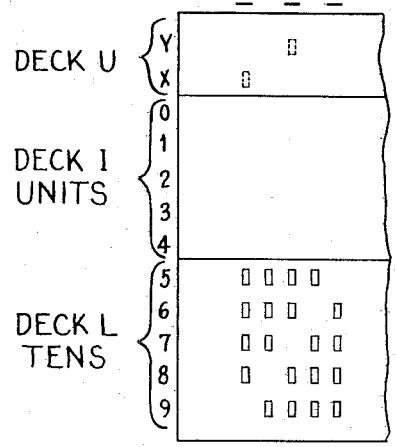

In Figures 14 and 14a there is shown the relationship existing between two detail cards at the time when the leading card of the two cards is about to be advanced in the new direction. The diagram of Fig. 14 shows that the trailing card is about to be fed into the feed rollers 17 and 17a while the leading card is in a position to be pushed in a new direction by the pusher 31. The diagram of Fig. 14a shows the overlapping condition existing between the trailing and leading card where the advancement of the leading card is now under the control of the rollers 47 and 48, and the advancement of the trailing card is under the control of the rollers 17 and 17a with the trailing card overlapping the leading card. The overlapping relationship exists until the trailing edge of the leading card passes the point of contact of the upper and lower rollers of the rollers 47 and 48 with the leading card feeding lengthwise while the trailing card feeds sidewise at a ratio of 3 to 1.

The feed rollers 47 and 48, each of which comprises an upper and lower roller, are respectively fastened to and driven by the shafts 50 and 49 as shown in Figure 11. The shaft 49 has fixed thereto the gear 51, which meshes with the spiral gear 52 of the shaft 3 while the shaft 50 is driven by the spiral gear 79 which meshes with the spiral gear 52 of the shaft 3 thereby permitting the two shafts to be driven at identical speeds. After taking control of the card from the finger 31 the rollers 47 and 48 advance the record card into the photoelectric scanning device where the card is scanned in a manner to be described subsequently.

The drive connection from the main shaft 3 to shafts 18, 19 and 49, 50 and the dimensions of the respective rollers 17, 17a and 47 and 48 is such that the peripheral speed of the latter rollers is considerably greater than the rollers 17, 17a with the result that the cards are advanced by rollers 47, 48 at a much greater speed than by the rollers 17, 17a.

Figure 13:
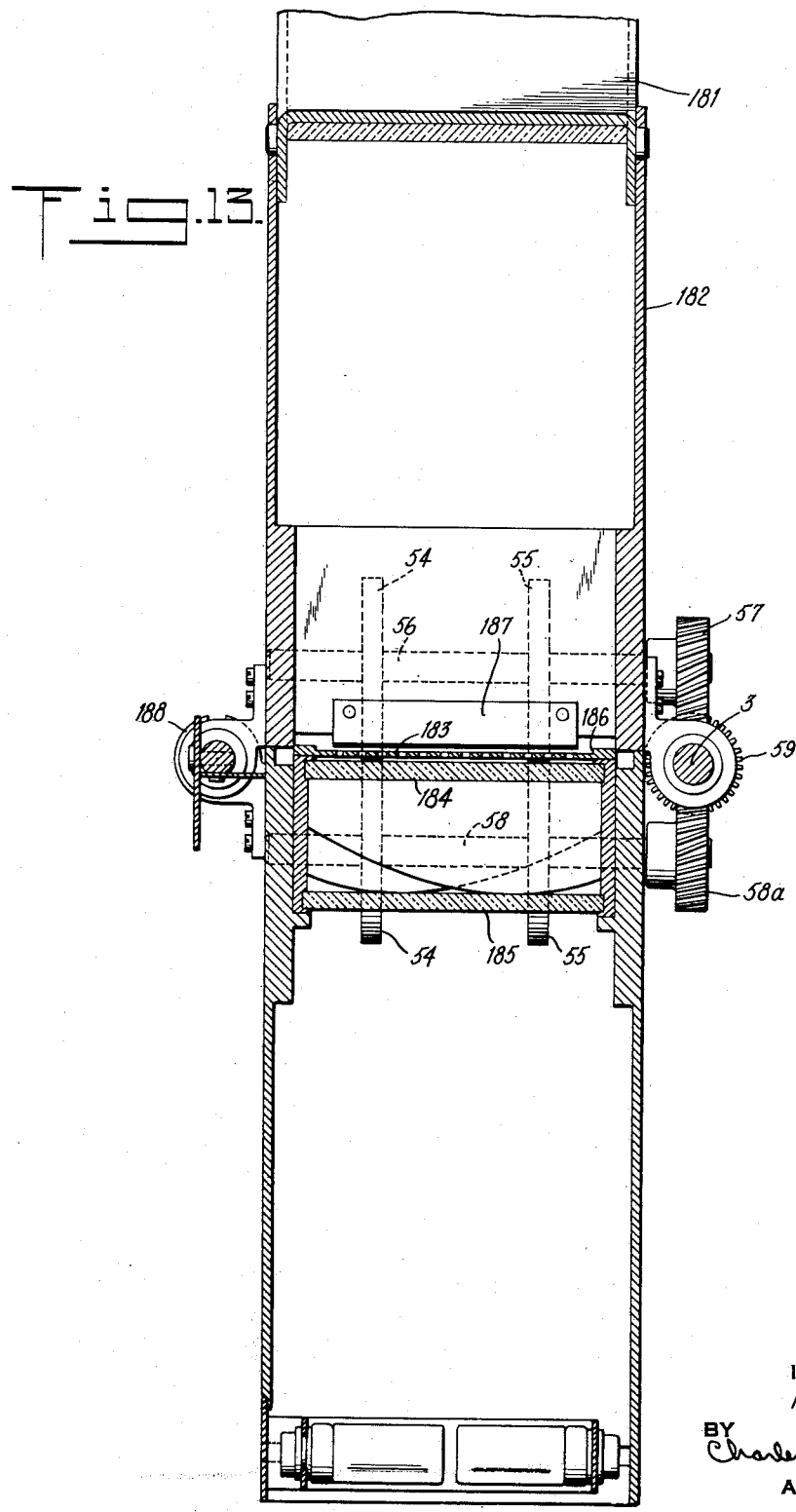
Fig. 13 is a section in line 13—13 of Fig. 1.

After the card has been scanned, the rollers 54 and 55 (Fig. 12), each of which comprises an upper and lower roller, move the record card away from the scanning device to the next set of rollers 60 and 61. The upper rollers are fastened to the shaft 56 which has secured thereto a spiral gear 57 which meshes with the spiral gear 59 of the shaft 3 while the lower rollers are fastened to the shaft 58 which has secured thereto a spiral gear 58a (Fig. 13) which also meshes with the spiral gear 59 of the shaft 3 whereby the rollers 54 and 55 are driven at identical speeds by the main shaft 3 such that the record card is moved on to the next set of rollers 60 and 61 past the fingers 80 and the card lever controlled photocell station.

The rollers 60 and 61 each comprise an upper and lower roller where the upper rollers are coupled to the shaft 62 carrying a spiral gear 63 which meshes with the spiral gear 64 of the shaft 3 while the lower rollers through the shaft 65 are geared to the shaft 3 in a similar manner but which is not shown.

*Pocket selecting mechanism*

The cards are then fed from the rollers 60 and 61 into the field of the pocket selection magnets BPM and CPM (Fig. 5). The magnets BPM and CPM respectively cause the matched card or cards to be deposited in either the B card pocket or the C card pocket depending upon the coupling existing between the photocell compartments and the associated magnets.

The magnets are mounted upon the supporting member 92 (Fig. 12) which is pivotable about the shaft 93 movably secured to the frame of the machine by the manipulating of the handle 94. There is associated with the magnets BPM and CPM the respective chute blades 95 and 96 having the ends 95a and 96a thereof shaped such that they may be operated by the proper magnet while the other ends of the blades 95 and 96 are fixed to the respective brackets 98 and 99. The ends 95a and 96a of the chute blades are biased in a downward direction in order to be seated within the recess 97 (Fig. 12) of the base plate 82 such that if neither of the magnets BPM or CPM are energized the cards will pass over the ends of the chute blades 95 and 96 and be deposited in the A card pocket as shown schematically in Fig. 9a.

When the magnet CPM is energized each of the chute blades 95 and 96 of electromagnetic material will be attracted to the respective magnet thereto in a manner to be described subsequently thus causing the selected card to be deposited in the C card pocket (see Fig. 9a). When the magnet BPM is energized the chute blade 95 will be attracted toward the magnet BPM thus causing the card to pass over the end of the chute blade 96 and under the end of the chute blade 95 and to be deposited in the B card pocket (Fig. 9a).

The card guide plate 100 (Fig. 5) which is fastened to the cross members 101, 102 and 103 aids in the aligning of the cards as they pass over the chute blades 95 and 96 into the A card pocket.

After passing the depressed ends 95a and 96a of the chute blades, the cards come under the control of the feed rollers 103 and 104 which are driven at a lesser peripheral speed than the prior feed rollers in order to reduce the impact of the cards against the side of the card pockets. The feed rollers 103 and 104 each comprise an upper and lower roller where the upper rollers are secured to the shaft 105 while the lower rollers are fixed to the shaft 106. The shaft 105 is fixed to the gear 107 which meshes with the gear 108 of the shaft 3 while the shaft 106 is similarly coupled to the shaft 3.

Those cards which are not deposited in the C card pocket are advanced by the feed rollers 109, 110 and 111 and 112 which are driven at the same rate of speed as the rollers 103 and 104. Each of the rollers 109 and 110 have an upper and lower roller where the upper rollers are secured to the shaft 113 which through the gear 114 meshes with the gear 115 of the shaft 3 while the lower rollers are driven by the shaft 116 (Fig. 1) which also meshes with the shaft 3. The rollers 111 and 112 each comprise an upper and lower roller where the upper rollers are driven by the shaft 117 which through the gear 118 fastened thereto meshes with the gear 119 of the shaft 3 while the lower rollers are fastened to the shaft 120 (Fig. 1) which meshes with the shaft 3 in a similar manner but which is not shown.

Those cards which are not deposited in the B card pocket are advanced toward the A card pocket by the feed rollers 121, 122 and 123 and 124. The feed rollers 121 and 122 each comprise an upper and lower feed roller where the upper rollers are driven by the shaft 125 which through the gear 126 fastened thereto meshes with the gear 127 of the shaft 3 while the lower rollers are driven by the shaft 128 which meshes with the gear 127 of the shaft 3 in a similar manner. The feed rollers 123 and 124 each comprise an upper and lower roller where the upper rollers are secured to the shaft 129 having fastened thereto the gear 130 which meshes with the gear 131 of the shaft 3 while the lower rollers are fixed to the shaft 132 which meshes with the gear 131 of the shaft 3 in a similar manner.

As the cards enter the proper card pocket they hit the chute deflecting blade 133 (Fig. 7) which assists in the stacking of the cards upon the stacker plate 134. The blade 133 is fastened to the bracket 135 which is similar to the brackets 98 and 99 of card pockets B and C.

*Frontal register*

As the cards are stacked upon the plate 134 they are continuously patted frontally and laterally by the frontal register 136 (Fig. 10) and the lateral register 163 (Fig. 7) for the purpose of keeping the cards in alignment while they are being stacked. The frontal card register 136 has a pair of offsets 136a and 136b (Fig. 5) which are pivotally movable about the studs 138 and fastened to the frame of the machine by means of the channel section 139 (Fig. 7). A shaft 140 which is disposed across the upper region of the offsets 136a and 136b has the midpoint thereof fixed to the elongated member 141 having an upper 142 and lower 143 U shape notches. The member 141 rides in the slot 144 cut in the frame of the machine as well as riding in a slot (not shown) cut in the housing 145. The slot 144 cooperates with the notch 142 so as to limit the movement of the member 141. The lower notch 143 rides upon the top of the shaft 146 having a pair of flat sides 146a and 146b where the shaft has fastened thereto the gear 147 which meshes with the gear 148 of the shaft 3. Thus it is to be noted that as the shaft 146 rotates the flat sides 146a and 146b thereof cam the side 143a of the notch 143 to the right (Fig. 10) causing the member 141 to be moved to the right with the returning movement being supplied by the spring 149 fastened between the member 141 and the front part of the machine. This oscillating movement of the member 141 imparts a continuous rocking motion to the frontal register 136 whereby the cards deposited on the stacker plate 134 will be tapped into alignment.

There is also secured to the member 141 by means of the studs 150 and 151 the respective lateral members 152 and 153. The member 152 on the lower edge thereof has a cam portion 152a and a notch 152b while the member 153 is similarly constructed but which is not shown. Each of the members 152 and 153 are adapted to slide in a slot (not shown) cut in the housing 145.

When the cards are to be removed from the stacker plate 134, the frontal register 136 is moved in a clockwise direction about the shaft 138 causing the notches of the members 152 and 153 to be locked in the slots of the housing 145 thus retaining the frontal register 136 in a locked position. In order to release the register 136 there is provided a pin 154 secured to the shaft 146 which contacts the cam portions of the members 152 and 153 during rotation of the shaft and pushes the members 152 and 153 in an upward direction thereby releasing the notches of the members 152 and 153 from the locking position and restoring the spring biased register 136 to the normal position thereof.

*Lateral register*

There is fixed to the bottom of the shaft 146 (Figs. 6 and 8) a four sided flat face cam 155 upon which the roller 156 rides. The roller 156 is attached to the underside of a bifurcated arm 157 which straddles the shaft 146 at a position above the cam 155. Secured to the arm 157 is a linkage member 158 having three spaced slotted portions 158a, 158b and 158c. The arm 159 which is pivotally secured to the shaft 160 has a stud 161 secured thereto which is adapted to slide within the slot 158a. There is also connected to the arm 159 a spring 162 fixed at the other end to the housing 145 so as to bias the arm in a counterclockwise position about the shaft 160. There is fixed to the other end of the shaft 160 a lateral register member 163 (Fig. 7) which is adapted to tap the sides of the cards as they are deposited on the stacker plate. It should be noted that each card pocket has a lateral register member which is coupled to the linkage 158.

The rotation of the shaft 146 causes the cam 155 to rotate. The roller 156 is forced to follow the contour of the cam 155 due to the spring bias effect of the arms 159, 164 and 165 upon the linkage member 158 to which the roller is secured. As the roller rides upon the high portion of the cam 155 the member 158 is pushed to the right driving the arms 159, 164 and 165 in a clockwise manner about the respective shafts 160, 166 and 167. As the roller rides upon the flat face of the cam, the spring fixed to each of the arms 159, 164 and 165 causes the arms to move in a counterclockwise manner about the respective shafts causing the linkage member 158 to move to the left. This movement of the member 158 is imparted to the shafts 160, 166 and 167 thus causing the respective lateral register members to tap the cards deposited on the stacker plate.

*Stacker plate movement*

As the selected cards are deposited upon the stacker plate 134 (Figs. 7 and 10), the lever arm 168 which is pivoted at 169 about the bracket 135 is pushed up against the plunger 170. When a predetermined number of cards are piled on the plate 134, the plunger 170 being pushed in an upward direction causes the closing of the contacts 171. The closing of the contacts 171 results in the energization of the A stacker magnets ASM (Fig.

8) thereby attracting the armature 172 and freeing the spring biased clutch pawl 173 for engagement with the ratchet 174 fastened to the shaft 146. The pawl 173 is secured to the disk 175 such that as the clutch tooth 173a of the pawl engages the ratchet the disk 175 is rotated which, in turn, drives the gear 176. The gear 176 meshes with and drives the gear 177 which rotates the screw 178. The screw 178 meshes with the threaded member 179 through an opening in the sleeve 179a which surrounds the screw 178 and carries stacker plate 134 thereby causing the plate 134 to be lowered. As the plate 134 is lowered the contacts 171 open and the magnets ASM are restored to the unenergized state thereof, resulting in the armature 172 returning to the normal position thereof whereby the pawl 173 is engaged thereby freeing the clutch tooth from the ratchet 174. It is to be noted as cards are deposited upon the plate 134 that each downward movement of the stacker plate takes place during one revolution of the shaft 146 after the ratchet 174 has been engaged. When the stacker plate 134 reaches the bottom of the pocket, the plate 134 may be quickly elevated by pushing up on the handle 180 portion of the threaded member 179 thus disengaging the teeth of said member from the screw 178 and permitting the plate to slide easily over the screw 178. It is to be noted that when the sleeve 179a reaches the bottom of the card pocket the pocket stop contacts (not shown) will disengage resulting in an open circuit in the motor M hold circuit causing the motor to be brought to a halt thus preventing damage to the card pocket mechanism.

Before placing the machine in operation it is necessary that the stacker plates of each of the card pockets be in contact with the lever arm 168 of the respective pockets. If this operation is not performed the machine will not be capable of running as shall be pointed out subsequently.

Photoelectric cell scanning device

A cross-sectional view of the photoelectric cell scanning device is shown in Fig. 12. The source of light L1 and the optical condensers 83 and 84 are contained within the housing 85 which is mounted on the top of the machine. The housing 85 is coupled through a pair of blocks 86 (Figures 2 and 5) to a movable shaft 87 which is supported by a pair of projections 88 attached to the frame of the machine whereby the housing is adapted to be pivotally moved away from the position on top of the machine whenever an examination of the machine in the vicinity of the feed rollers 60, 61 and 103, 104 is required. The latching means 89 (Fig. 1) enables the housing to be securely locked in position on top of the machine when the machine is in operation. Within the housing 85 the source of light L1 is securely positioned therein with a cylindrical reflecting means 90 directing the light rays from L1 toward the lens 83. The lens 83 causes the light rays to be directed toward the lens 84 which produces parallel light rays. The floor of the housing 85 is constructed with equally spaced openings 91 for the purposes of ventilation.

The light rays from the lens 84 impinge upon an angularly disposed reflecting member 181 which is carried by the supporting unit 182. The supporting unit 182 is pivotally mounted on the shaft 3 by means of the bearings 182a and 182b (Fig. 2) and carries the top rollers of the feed rollers 47, 48, 54 and 55 in addition to the reflecting member 181. There is positioned beneath the unit 182 in the path of the reflected light a grid plate 183 having perforations matching the hole size and hole spacing of the punched cards being used, a transparent block 184 over which the detail cards are to pass, twelve individual spherical lens blocks A, B, C, D, E, F, G, H, J, K, L and M, a second supporting transparent block 185 and twelve light responsive elements PCA, PCB, PCC, PCD, PCE, PCF, PCG, PCH, PCJ, PCK, PCL and PCM which are adapted to cooperate with the associated lens blocks.

A complementary punched master card such as that shown in Fig. 33 and having a pair of openings 192 and 193 may be placed in the recess 186 (Fig. 13) upon the top of the plate 183 such that when the unit 182 is in a closed position the resilient cushion 187 will hold the master card in a stationary position and the rollers 54 and 55 will pass through the respective openings 192 and 193. When the unit 182 is in a closed position it is securely retained in this position by the locking means 188. With the master card in position, the lens block M spans columns 17–20 of the master card (Fig. 33), the lens L spans columns 21–24, the lens K spans columns 25–28, the lens J spans columns 25–32, etc.

The lens blocks A, B, C . . . and M each extend over a space equivalent to four card columns and are positioned so as to focus the light rays from the source of light L1 upon only one of the photocells where each block and associated photocell and amplifying circuit constitutes a compartment. As the prepunched detail cards pass through the scanning device between the grid plate 183 and the block 184, those cards which favorably compare with the complementary punched master card in one or more of the compartments will cause the photocell of those compartments to be blocked off from the source of light L1. It is to be noted that the lenses A to M are alternately given a different curvature (Fig. 13) so that the photocells PCA to PCM may be staggered.

Card start operation

Referring to Fig. 36a, upon closing the main switch S1 a source of current is supplied to a thermal coil TC through a complete circuit which may be traced from the line 200, which is coupled to the high side of the main source of power, line 202, normally closed contact points TD1 of the time delay relay TD, resistor R1, thermal coil TC to line 201 which is coupled to the low side of the main source of power. As the thermal coil is heated, the normally open points TC1 of the thermal coil TC will close, thus causing a circuit to be completed from line 200, line 203, the now closed points TC1, resistor R2 and time delay relay TD to the line 201 whereby the relay TD becomes energized. With the energization of the relay TD, the contact points TD1 shift from the normally closed position thereby opening the circuit through the coil TC and retaining the circuit through the relay TD. The use of the thermal coil is employed for the purpose of preventing the starting of the machine until the heating of the filaments of the tubes of the circuit associated with the machine.

Likewise, with the closing of the main switch S1 a circuit will be completed from the line 200, line 204, resistor R3, light source L1, light source L2 and the light check relay LCR. If either the light source L1 or L2 is not in operating condition, the relay LCR will not be energized, thus preventing the closing of the contact points LCR1 which points must be closed before the motor M can be started.

The next step is to momentarily depress the start key, but as pointed out previously, it will be of no consequence unless the stacker plate is initially in a position whereby the contacts 171 (Fig. 7) of each of the card pockets are all in a closed position. With the contacts 171 of each of the card pockets in a closed position when the start key is in a depressed position, a circuit may be traced from line 201, in parallel through contacts 171 now closed, resistors R48, R49 and R50, start key, contacts TD2 now closed, jam contact points JCLR1 normally closed, contacts LCR1 now closed, motor relay MR and line 205 in parallel with resistor R51, card control relay CCR and line 207 to the line 200. Upon completion of this circuit which is made when the start key is depressed the relays CCR and MR are energized (as shown in the timing diagram of Fig. 44a) thereby resulting in the closing of the associated contact points CCR1, CCR2 and CCR3, and MR1 and MR2.

The energization of the motor relay MR causes the contact points MR1 and MR2 to be closed, thus completing a circuit through the motor M which renders the motor operable.

The closing of the contact points CCR2 enables a circuit to be completed from the line 200, line 220, time delay start relay TDS, contact points CCR2 now closed and resistor R52 to the line 201. The closing of the contacts CCR3 sets up a parallel circuit around the relay TDS which may be traced from line 200, line 221, capacitor C10, contacts CCR3 now closed to the line 220. The relay TDS is used for the purpose of insuring that the motor is up to full speed before the cards are fed from the card hopper with the energization of the relay TDS being delayed until a charge has built up on the capacitor C10.

With the relay TDS being energized and the contacts TDS1 in a closed position, the solenoid control relay SCR is energized when the cam controlled contacts CR27 close at 240° machine time (Fig. 44a). This circuit may be traced from line 200, line 222, contacts CR27 now closed, contacts TDS1 now closed, relay SCR, resistor R53 to the line 201.

With the energization of relay SCR and the making of the cam controlled contacts CR28 at 330° machine time, a hold circuit for the relay SCR is made which may be traced from the line 200, line 222, contacts CR28 now closed, contacts SCR1 now closed, relay SCR, resistor R53 to the line 201.

The relay SCR upon becoming energized at 240° machine time will cause the contacts SCR2 to close resulting in a complete circuit being made from the line 200, line 206, resistor R54, card lifter solenoids CLS, contacts SCR2 now closed, contacts SR1 normally closed to the line 201 whereby the solenoids CLS are energized. Upon becoming energized the solenoids CLS cause the card lifting bars 71 to be drawn down whereby the bottom card in the card hopper positions itself in the path of the picker knife slides 13 and 13a (Fig 11). The solenoids CLS will become de-energized whenever the relay CCR is de-energized or the stop key is depressed, thus allowing the card lifting bars to return to the normal position thereof whereby the cards are lifted above the level of the picker knife slides thereby preventing the feeding of the cards.

At 175° machine time of the second card cycle, the picker knife slides 13 and 13a move the bottom card from the hopper toward the direction of the feed rollers 17 and 17a which rollers take over the control of the card at 258° machine time.

Prior to the time that the feed rollers lose control of the card, the fingers 27 take over the control of the advancement of the card at 163° machine time of the third card cycle. At 205° machine time the card has reached the end of the forward travel thereof and remains at rest until 252° machine time (Fig. 44b) of the third card cycle when the pusher mechanism starts the card moving in the new direction.

At 288° machine time of the third card cycle the feed rollers 47 and 48 take over the control of the card and at 360° the rollers 47 and 48 begin to feed the card into the scanning device.

At 222° of the fourth card cycle the leading edge of the card passes the card lever photocell station which at 330° machine time results in the energization of the card lever relay CLR and the closing of the contacts thereof in a manner to be described subsequently.

The energization of the relay CLR closes the contacts CLR1 (Fig. 36a) which in conjunction with the closing of the cam controlled contacts CR3 at 15° machine time of the fifth card cycle produces a holding circuit for the relays MR and CCR which may be traced from line 200, lines 205 and 207, contacts LCR1 now closed, contacts JCLR1 normally closed, contacts CCR1 now closed, stop key contacts A, B and C, pocket stop contacts, contacts CLR1 now closed, contacts SR2 normally closed to the line 201.

Card lever operation

After the scanning machine is placed in operation, the continued operation of the machine is determined by the card lever photocell CLPC (Fig. 12) which controls the card lever relay CLR and the jam card lever relay JCLR.

The photocell CLPC at the time that the cam controlled contacts CR1 makes checks the machine each card cycle to determine if a card is present in order to continue the machine in operation while at the time that the cam controlled contacts CR2 makes checks the machine each card cycle to determine if a card is absent for the purpose of stopping the machine in such case.

The circuit arrangement coupled to the photocell CLPC which controls the operation of the machine is shown in Fig. 36a while the source of light L2 which normally directs the rays thereof through the opening 81 of the plate 82 upon the photocell CLPC and causes the ionization of the photocell CLPC is shown in Fig. 12.

The normally ionized photocell CLPC is coupled between the line 200 and a —10 volts bias power supply through a circuit which may be traced from the line 200, line 208, photocell CLPC, the resistor R4 to the —10 volts bias supply. The first checking operation of the scanning machine takes place when the cam controlled contacts CR1 close at 330° machine time of each card cycle as shown in the timing diagram of Fig. 44b. At the time that the contacts CR1 close if a detail card blocks the light rays from the source of light L2 from impinging upon the photocell CLPC, the photocell CLPC is made non-conductive thus causing the control grid of the tube V1, which is coupled to the —10 volts bias supply through the resistors R4 and R5, to be biased negatively with respect to the cathode of V1 which is coupled to zero potential line 201. The impressing of the negative potential upon the control grid of V1 causes the tube V1 to be rendered non-conductive thereby causing the plate potential of V1 to increase.

Since the anode of V1 is coupled through the resistor R6 and the now closed contacts CR1 to the control grid of the tube V2, the higher plate potential of V1 overcomes the bias potential which is applied to the grid of V2 through the resistor R9 from a bias supply of —105 volts, thereby causing the tube V2 to be made conducting. The tube V2 which is coupled to the line 200 through the card lever relay CLR and the resistor R7 causes the energization of the relay CLR upon V2 being made conductive.

A holding circuit for the relay CLR is established through the closing of the cam controlled contacts CR3 which contacts close at 15° machine time of each card cycle as shown in the timing diagrams of Figures 44a and 44b thus causing the energization of the card lever hold relay CLHR where the holding circuit may be traced from the line 200, line 209, the now closed contacts CR3, relay CLHR, contacts CLR2 now closed, the resistor R12 to the line 201. When the relay CLR is energized the contact points CLR1 close thus resulting in a continually running circuit for the motor M as pointed out previously.

As long as there is a card blocking the photocell CLPC from the source of light L2 at the time the contacts CR1 close, the relay CLR will be energized to keep the machine running.

When the machine is first started, there is no card blocking the source of light L2 from the phtocell CLPC so it is necessary to hold the start key in a depressed position until the first record card from the feed hopper reaches the opening 81 as indicated in the fourth card cycle of the timing diagram of Fig. 44b. This is necessary to hold the relays MR and CCR energized until the relay CLR can take over the hold circuit.

If no card is blocking the light L2 from the photocell CLPC at the time CR1 closes, then the photocell CLPC being in an ionized state will overcome the bias impressed upon the grid of V1 causing V1 to be rendered conducting. With V1 being in a conductive state, the grid of V2 will be driven more negative and thus retain the tube V2 in a nonconductive state, which will prevent the relay CLR from being energized. Since CLR is not energized the contact points CLR1 will remain in a normal open position thus preventing a holding circuit from being made for the continued operation of the motor M and causing the motor M to come to a stop.

The second check on the operation of the machine during each card cycle takes place at the time that the cam controlled contacts CR2 close which contacts close at 150° machine time for each card cycle as shown in the timing diagrams of Figures 44a and 44b. The purpose of this checking operation is to test for the absence of a detail card. If no card is present at the photocell CLPC station when the contacts CR2 close, the photocell CLPC will be in an ionized state, thus decreasing the bias upon the normally negatively biased control grid of the tube V1 where the bias for the tube V1 is supplied by a bias source of —10 volts. The anode of V1 is coupled through the resistor R6 and the closed contacts CR2 to the negatively biased control grid of the gas tube V3 where the bias on the control grid of V3 is supplied from a bias source of —105 volts through the resistor R10. With the tube V1 being in a conductive state the anode potential thereof is decreased, thus failing to overcome the bias of the control grid of V3 and, as a result, keeping V3 in a non-conductive state. Inasmuch as V3 remains nonconductive, the jam card lever relay JCLR which is coupled in the anode circuit of V3 contact does not become energized, thus retaining the contact points JCLR1 in a closed position and allowing the machine to continue in operation. The circuit involving the tube V3 may be traced from the line 209, line 210, jam reset contact normally closed, the parallel combination of the resistor R11 and the neon indicating lamp L3, relay JCLR, the anode of V3 through the tube V3, the cathode of V3, which is coupled to the screen grid of V3, to the line 201.

If at the time the contacts CR2 close, the light L2 is blocked off from the photocell CLPC by a detail card the photocell CLPC is in a deionized state causing the negatively biased tube V1 to be made non-conducting. With V1 being non-conducting the anode potential thereof increases such that the bias upon the tube V3 is overcome thereby causing the tube V3 to conduct. Since V3 is conducting the relay JCLR is energized and the jam indicator light L3 will glow. The energization of the relay JCLR causes the contact points JCLR1 in the holding circuit of the motor M to open thus bringing the machine to a stop. In order to start the machine again it is necessary to remove the cause of the jam, open the jam reset contacts thus dropping out the tube V3 and the relay JCLR and then depress the start key.

The machine is now in operation, feeding detail cards successively past the scanning device in the manner and at the time indicated in the timing diagram of Figures 44a and 44b such that all the detail card columns of one card have passed over the 48 master card columns before any columns of the following detail card are being scanned.

This enables various combinations of searching conditions to be set up which may be generally stated as follows. A detail card may be deposited in a selected card pocket when a blackout occurs in one photocell compartment; when a blackout occurs simultaneously in two or more compartments; when a blackout occurs in one compartment at the time of no blackout in a second compartment; or when a blackout of one compartment sequentially occurs before a blackout in a second compartment. Each of these conditions will hereinafter be more specifically explained in connection with the circuits involved.

*Blackout in a single compartment*

In the scanning device there are twelve compartments each of which consists of a light responsive element and an associated photocell amplifying circuit where each element is capable of detecting a matching condition over a field of four columns in width.

Inasmuch as the circuit elements of each compartment are similar, the circuit diagram of only one compartment shall be described in detail.

Assuming that a search is to be made for a blackout of compartment A (Fig. 36e) it is necessary that hub H1 be coupled to H2, H4 to H5, and H7 to H8 in order that when a matching condition is encountered the magnet BPM (Fig. 36b) will be energized to direct the matching card to card pocket B as will now be specifically explained.

The amplifying circuit of the first compartment is shown in Figure 36e. The light responsive element PCA is coupled between the mid-point of the resistors R16 and R17 and the control grid of the tube T1 while the resistors R16 and R17 are coupled between the high 189 and low 190 side of the main power supply source of 150 volts. The control grid of the tube T1 is negatively biased by the resistors R18 and R19 which are coupled between grid of T1 and the low side 190 of the main source of power with the mid-point of the resistors R18 and R19 being further coupled to the low side 191 of the bias power supply source through the resistor R20. The cathode of T1 is connected directly to ground while the anode thereof is coupled through the plugged hubs H1 and H2 through the resistor R21 to the high side 189 of the 150 volt source. As long as the source of light impinges upon the photocell PCA the flow of current through the photocell increases in a positive direction thus overcoming the bias imposed upon the control grid of T1 and causing T1 to be conducting. When a matching condition is encountered the photocell PCA is cut off from the source of light L1 thus de-ionizing the photocell PCA and eliminating the current flow therethrough thereby causing the control grid of T1 to be driven below cut-off and rendering the tube T1 non-conducting.

The anode of T1 is coupled to the control grid of the tube T2 through the parallel resistor R22 and capacitor C1 arrangement. The control grid of T2 is also coupled to the low side 191 of the bias power supply source of —105 volts through the resistors R23 and R24 whereby the control grid is negatively biased. The cathode of T2 is coupled directly to the low side 190 of the +150 volt source of power while the anode thereof is coupled through the resistor R25 to the high side 189 of the 150 volt source of power. The screen grid of T2 is coupled to the high side of the 150 volt source of power through the resistor R26 and is also coupled to the cathode of T2 through the screen bypass condenser C2. The suppressor grid of T2 through the plugging of the hubs H4 and H5 is coupled to the cathode thereby placing the suppressor grid at ground or zero potential. If the hubs H4 and H5 were not connected to each other then the suppressor grid of T2 would be coupled through the resistor R27 and R29 to the low side of the bias power supply source thereby impressing a negative bias upon the suppressor grid.

The anode of T2 is coupled through the capacitor C3 to the control grid of the normally conducting tube T3 with the control grid thereof being maintained at a zero bias through the coupling of the grid through the resistor R30 to the line 190. The cathode of T3 is coupled directly to the low side 190 of the main source of power while the anode thereof is coupled to the high side 189 through the resistor R31.

The anode of T3 is also coupled through the capacitor C4 through the line *a* to the control grid of the gas tube T4 (Fig. 36c). The screen grid of T4 is coupled through the resistor R32 through the line *b* to the cathode of the gas tube T5 (Fig. 36e) thus placing the screen grid of T4 under the control of the cathode of the tube T5 while the anode of T4 is coupled through the resistor R35, the cam controlled contacts CR6 to the line 200. The cathode of T5 is coupled to the line 190 through the resistor R33 and to the line 191 through the resistor R34 while the control grid of T5 through the coupling of the hubs H7 and H8 is coupled to the line 190 thus maintaining the tube T5 in a normally conducting condition and resulting in a positive potential being supplied to the screen grid of T4 by the cathode of T5. The screen grid of T5 is coupled directly to the cathode while the anode thereof is coupled through the resistor R35, through the line n Figs. 36e and 36c), the cam controlled contacts CR6 to the line 200. It should be noted if the control grid of T5 was not coupled to the line 190 that the control grid would be negatively biased thus rendering T5 non-conducting. The bias would be supplied by the resistors R48 and R49 which are coupled between the control grid of T5 and the line 190 where the juncture of the resistors R48 and R49 is also coupled to the line 191 through the resistor R50.

Now when the photocell PCA is blocked off from the source of light L1 thus signifying a matching condition the negative bias applied to the control grid of T1 predominates and renders T1 non-conductive. With T1 non-conducting, the anode potential thereof increases which when applied to the biased T2 overcomes the bias of T2 causing T2 to conduct. With T2 in a conducting condition the anode potential thereof decreases which when applied to the grid of T3 renders T3 non-conducting.

With T3 being in a non-conducting condition the anode potential thereof increases which when applied to the control grid of T4 drives the potential of the grid above the firing point. Since the tube T5 is in a conducting state the potential of the screen grid of T4 is also above the firing potential such that when the cam control contacts CR6 close at 0° machine time as shown in Fig. 45 thereby applying a positive potential to the anode of T4, the tube T4 is rendered conductive. At 210° machine time (Fig. 45) the cam controlled contact CR7 (Fig. 36c) closes which causes the transfer relay TR to be energized (see Fig. 45) thus closing the contacts TR1. The closing of the contacts TR1 results in a circuit being completed from the anode of T4, contacts TR1 now closed, signal relay SRA, the resistor R36 to the line 200 whereby the relay SRA is energized and the associated contacts SRA1 are closed. The closing of the contacts SRA1 results in a holding circuit being made for the signal relay SRA when the cam controlled contacts CR8 closes as shown in the timing diagram of Fig. 45. This circuit may be traced from line 200, resistor R36, relay SRA, contacts SRA1 now closed, switch S3 as shown, and contacts CR8 now closed to the line 201. It is to be noted that with the closing of the contacts SRA1 that the anode of T4 is returned to ground potential and hence is rendered non-conductive and is now in condition for the next card cycle.

*Pocket selecting circuit*

The circuit arrangement for selecting the card pocket in which the matched card is to be deposited is shown in Fig. 36b.

If it is desired that the matched card be deposited in the B card pocket then when the cam controlled contacts CR4 closes at 10° machine time of the second card cycle (Fig. 45), a circuit may be traced from the line 200, line 211, contacts SRA2 now closed due to the relay SRA being in an energized state, switch S2 in the position as shown, the resistor R12 to the normally biased control grid of the gas tube V4. The control grid of V4 is coupled to a negative bias of −30 volts through the resistor R13 while the screen grid of V4 is coupled to the cathode which is connected to the line 201 through the now closed contacts CCR4 thereby maintaining the tube V4 in a normally non-conducting condition.

When the circuit is completed to the control grid of V4 from the line 200 through the contact points SRA2 the negative bias applied thereto is overcome and with the closing of the cam controlled contacts CR5 at 0° machine time of the second card cycle (Fig. 45), the tube V4 is made conducting thereby energizing the B pocket magnet BPM (Fig. 45) which is in the anode circuit of the tube V4. The energization of the magnet BPM attracts the chute blade 95 and causes the matched card to be deposited in the B card pocket.

If it is desired that the matched card or cards be deposited in the C card pocket then when the contacts CR4 close a circuit may be traced from the line 200, line 211, contacts CR4 now closed, contacts SRA2 now shifted due to the relay SRA being in an energized state, switch S2 now shifted to contact position C, and resistor R15 to the negatively biased control grid of the gas tube V5 which is also coupled to the control grid of the gas tube V6. The control grid of V5 is coupled to a bias power source of −30 volts through the resistor R14 while the screen grid thereof is coupled to the cathode which is connected through the now closed contacts CCR4 to the line 201. The gas tube V6 is also maintained in a normally non-conducting state due to the control grid thereof being coupled to the negatively biased control grid of V5 while the screen grid of V6 is coupled to the cathode thereof which, in turn, is connected to the line 201.

When a circuit is completed to the control grid of V5 at the time when CR5 closes, the bias impressed upon the control grids of V5 and V6 is overcome and the tubes V5 and V6 are rendered conductive.

When V5 is made conducting the C pocket magnet CPM is energized and when V6 is energized the B pocket magnet BPM is energized thereby attracting the respective chute blades and causing the matched card or cards to be deposited in the C card pocket. It is to be noted that due to the disposition of the chute blades of the B and C card pockets that it is necessary that whenever the magnet CPM is energized the magnet BPM be likewise energized.

After the detail cards are analyzed by the scanning device during one card cycle, they will be deposited in one of the three card pockets A, B and C in the following card cycle depending upon the energization of the relays BPM and CPM. Briefly it may be stated that if neither of the magnets BPM or CPM are energized the detail card will go to card pocket A. If only the magnet BPM is energized the card will pass over the chute blade 96 and under the chute blade 95 and be deposited in card pocket B. If the magnets CPM and BPM are jointly energized the card passes under the chute blades 96 and 95 and is deposited in card pocket C.

*Simultaneous blackout in two compartments*

It has been shown previously that when a detail card compares favorably with the master card in a single compartment that the matched card is operated upon to be deposited in a selected card pocket. Another operation capable of being performed by the scanning device is that where a simultaneous blackout or matching condition in two compartments may be detected.

Assuming that a search is to be made for a simultaneous blackout of compartments B and C (Fig. 36e) with the matched card or cards being stacked in the B card pocket it is necessary that the hub H17 of compartment C be coupled to hub H9 of compartment B, which, in turn, is coupled to the hub H10. Additional couplings to be made in compartment B are H12 to H13 and H15 to H16.

In this situation when light is falling upon the photocells PCB and PCC at the same time the negative bias imposed upon each of the tubes T6 and T11 will be overcome thereby rendering the tubes T6 and T11 conducting. With T6 conducting the plate potential thereof will be decreased such that the control grid of the tube T7 will be biased more negatively thereby retaining this tube in a non-conductive state. With T7 being in a non-conductive state the plate potential thereof will be increased causing the tube T8 to be made more conductive thereby decreasing the plate potential of the tube T8 which potential will prevent the firing of the gas tube T9 and thus prevent the energization of the relay SRB.

If the photocell PCB is blocked off from the source of light L1 at the time that the source of light L1 is impinging upon the photocell PCC, the tube T11 due to the plugging connection of H9 to H17 will cause the plate potential of the tube T6 to decrease. This decrease of plate potential will retain the tube T7 in a non-conducting state, which, in turn, due to the increased plate potential thereof will cause the tube T8 to be made more conductive and as before with the tube T8 being conducting the plate potential thereof decreases thus preventing the energization of the relay SRB. Now when the source of light is cut off simultaneously from the photocells PCB and PCC the plate potential of the tube T6 is increased due to the fact that each of the tube T6 and T11 are in a non-conducting state. With T6 being in a non-conducting state the plate potential thereof increases, which overcomes the negative bias imposed upon the tube T7 thus rendering the tube T7 conducting. The conducting of the tube T7 decreases the plate potential thereof which when applied to the tube T7 causes the tube T8 to be made non-conductive. With T8 being in a non-conducting state the plate potential thereof is increased which potential when applied to the control grid of the gas tube T9 (Fig. 36c) in conjunction with the positive pulse applied to the screen grid of T9 by the normally conducting tube T10 renders the tube T9 conducting causing the energization of the relay SRB, as pointed out previously. The energization of the relay SRB causes the shifting of the contacts SRB2 which in conjunction with the closing of the contacts CR4 applies a positive pulse to the grid of V4. With the grid of V4 now being above firing potential the tube V4 is rendered conducting when the contacts CR5 close thereby energizing the magnet BPM and causing the matched card or cards to be deposited in the B card pocket.

*Blackout in one compartment with no blackout in second compartment*

Another operation capable of being performed by the scanning device is where a card causing a blackout in one compartment and no blackout in a second compartment may be detected during the scanning process.

Assuming that a search is to be made for a blackout in compartment D at the time that no blackout is occurring in compartment E (Fig. 36e), it is necessary to plug the hubs H18 and H19 of compartment D, the hubs H26 and H27 of compartment E, the hubs H29 and H30 of compartment E, the hub H28 of compartment E to the hub H22 of compartment D, the hubs H24 and H25 of compartment D and the hubs H32 and H33 of compartment E. If the matched card or cards are to be deposited in card pocket B, then it is necessary to connect the contact points SRD2 of the signal relay SRD to the B pocket selecting magnet which may be done by the closing of the switch S16 (Fig. 36b). It is to be noted that with the plugging connection of the hub H28 to the hub H22 the second control grid of the tube T17 is under the control of the tube T22, such that the aforementioned grid is held at a negative potential whenever the light is cut off from the photocell PCE.

If the light is cut off simultaneously from the photocells PCD and PCE the respective tubes T16 and T21 coupled thereto will be rendered non-conducting, which in each case will cause the plate potential thereof to be increased. This increase in plate potential of the tube T21 will overcome the bias imposed upon the control grid of the tube T22 causing this tube to conduct. With the tube T16 being in a non-conducting state the plate potential thereof will be increased which will be applied to and overcome the negative bias of the control grid of the tube T17, but the tube T17 will not be able to conduct inasmuch as the suppressor grid thereof due to the coupling of the hubs H22 and H28 is under the control of the tube T22. Since the tube T22 is in a conducting state, the potential applied to the suppressor grid of the tube T17 is such as to prevent this tube from conducting, thus preventing the energization of the signal relay SRD. While the signal relay SRE will be energized under this condition, the magnets BPM will not be energized due to the open switch S17 coupled between the points SRE2 and the tube V4.

If the light source L1 is cut off from the photocell PCE and not from the photocell PCD, the tube T21 will be made non-conductive while the tube T16 will be made conductive. With T21 being in a non-conducting state the tube T22 will be rendered conducting which will prevent the firing of the tube T17 thus eliminating the possibility of the energization of the relay SRD in this situation.

When the source of light L1 is cut off from the photocell PCD and not the photocell PCE the tube T16 will be made non-conducting, while the tube T21 will be made conducting. With the tube T16 being in a non-conducting state the plate potential thereof increases, which when applied to the control grid of the tube T17 will overcome the bias applied to that tube. With the tube T21 being in a conducting state the plate potential thereof decreases which drives the control grid of the tube T22 in a negative direction thus retaining this tube in a non-conducting state. As a result of tube T22 being in a non-conducting state, the potential which is applied to the suppressor grid of the tube T17 through the coupling arrangement of H22 and H28 is such that in conjunction with the positive potential applied to the control grid of T17 will render T17 conducting. With T17 being made conducting the plate potential thereof is decreased which causes the tube T18 to be rendered non-conducting. With T18 being in a non-conducting state a positive pulse is applied to the gas tube T19 which in conjunction with the positive pulse being applied to the screen grid of T19 by the normally conducting tube T20 and the closing of the contacts CR6 causes T19 to be more conducting. The firing of this tube in conjunction with the closing of the cam control contacts CR7 will result in the energization of the signal relay SRD causing the matched card or cards to be deposited in the B card pocket.

*Selected time sequence*

Still another operation capable of being performed by the scanning device is that where a card causing a blackout in one compartment prior to a blackout in a second compartment is detected during the scanning process.

Assuming that a search is to be made for a blackout in compartment F prior to or at the time of a blackout in compartment G (Fig. 36f), it is necessary to plug hub H34 to hub H35, H42 to H43, H37 to H38, H45 to H46, H39 to H48 and H40 to H41. If the matched card or cards are to be deposited in card pocket B, then it is necessary that the contact points of SRF2 and SRG2 (Fig. 36b) of the respective signal relays SRF and SRG be coupled to the B pocket selecting magnet BPM. In searches of this nature it is a prerequisite for the proper operation of this circuit arrangement that the entries in the master card are in a desired sequence in the direction of card travel such that any part of the record passes the compartments in a particular sequence. It is also to be noted that the coupling existing between the hubs H39 and H48 places the tube T35 of the compartment G under the control of the tube T28 of the compartment F and that the tube T35 is normally non-conducting due to the negatively biased control grid thereby applying a negative pulse to the screen grid of the tube T34.

If the photocell PCF is blocked off from the source of light L1 at the instant that the photocell PCG is not blocked, the tube T26 will be made non-conducting causing in a manner as pointed out previously the tube T27 to be made conducting and the tube T28 to be made non-conducting which will cause the potential of the gas tube T29 to be raised above the firing point thereof as well as causing the tube T35 to be made conductive due to the coupling of the hubs H39 and H48. When T35 is made conductive the potential of the cathode is made positive which when applied to the screen grid of the tube T34 raises the potential thereof above the firing point. Since the photocell PCG will not be blocked off then the tube T31 will be conducting, the tube T32 non-conducting and the tube T33 conducting. With T33 being in a conducting state a negative pulse is applied to the control grid of the tube T34 thereby preventing the gas tube T34 from being ionized even though the potential of the screen grid of T34 is above the firing potential. It is to be noted in this situation that while the relay SRF will be energized the magnet SRG will not be energized due to the failure of the tube T34 being made conductive thus preventing the energization of the magnet BPM (Fig. 36b).

When the photocell PCG is blocked from the light L1 at the time that the light responsive element PCF is not blocked, the tube T31 will be made non-conducting, T32 conducting and T33 non-conducting whereby a positive pulse is applied to the control grid of the tube T34. With the light rays impinging upon the photocell PCF, the tube T26 will be conducting, T27 non-conducting and T28 conducting whereby a negative pulse is applied to the control grid of each of the tubes T35 and T29. The negative pulse applied to the control grid of T35 will increase the bias imposed upon the tube and keep T35 in a non-conducting state thereby causing a negative pulse to be applied to the screen grid of T34. While a positive pulse is applied to the control grid of T34, the tube T34 will be maintained non-conducting due to the negative pulse applied to the screen grid thereof thus preventing the magnet SRG from being energized. The tube T30 will be conducting and will apply a positive pulse to the screen grid of T29 but this tube will not be made conductive due to the negative pulse applied to the control grid thereof by the tube T28 thereby preventing the magnet SRF from being energized. Thus it is to be noted that since the magnets SRF and SRG will be unenergized the card selecting magnet BPM will also be unenergized.

When the photocell PCF is blocked off from the light L1 prior to or at the same time PCG is blocked, the tube T26 will be made non-conducting, T27 will be conducting and T28 will be non-conducting thereby causing a positive pulse to be applied to the control grid of each of the tubes T29 and T35. The tube T30 which is normally conducting will apply a positive pulse to the screen grid of T29 which in addition to the positive pulse applied to the control grid thereof by the tube T28 and the closing of the contacts CR6 will cause the tube T29 to conduct. When PCG is blocked off after the photocell PCF the tube T31 will be non-conducting, T32 conducting and T33 non-conducting thereby causing a positive pulse to be applied to the control grid of the tube 34. Since a positive pulse is applied to the control grid of T35 by the tube T28, the tube T35 is made conducting causing a positive pulse to be applied to the screen grid of the tube T34. The pulses applied to the grids of T34 in addition to the closing of the cam controlled contacts CR15 (Fig. 36d) causes the tube T34 to be made conductive.

When the transfer relay TR (Fig. 36c) closes at 210° machine time (Fig. 45) causing the contacts TR6 to close, a circuit may be traced from the anode of T29, contacts TR6 now closed, magnet SRF, and resistor R41 to the line 200. The energization of the magnet SRF closes the contacts SRF1 and the contacts SRF2. When the contacts SRF1 are closed a holding circuit is made for the magnet SRF with the closing of the cam controlled contacts CR13 and the tube T29 is made non-conducting.

When the transfer relay TRA (Fig. 36a) closes at 270° machine time (Fig. 45) causing the contacts TRA1 (Fig. 36d) to close, a circuit may be traced from the anode of T34, contacts TRA1 now closed, magnet SRG, and resistor R46 to the line 200. The energization of the magnet SRG closes the contacts SRG1 and shifts the contacts SRG2. When the contacts SRG1 are closed at the time of the closing of the contacts CR16, a holding circuit is made for the magnet SRG and the tube T34 is made non-conductive.

Thus with the contacts SRF2 and SRG2 (Fig. 36b) now closed a circuit is completed through the switch S2 to the tube V4 whereby V4 is made conducting and the magnet BPM is energized causing the chute blade 95 to operate upon the card or cards having the selective sequence of data sought.

*Hold-over circuit*

It is to be noted in the normal operation of the scanning machine that due to the spacing between the advancing cards as well as the operation of the cam controlled contacts CR6 and CR14 which return the circuit to an original operating condition, the scanning device normally cannot detect the presence of dependent data represented over two or more successive cards.

Another operation capable of being performed by the scanning machine is the detecting of dependent data divided over two or more record cards. In order to accomplish this operation it is necessary that a hold-over circuit for storing the responses be set up which retains the blackout responses over two or more cards, as the case may be, until the dependent data sought for is found.

Assuming that a search is to be made for a blackout of compartments H, J and K (Figures 36f and 36g) where the blackout of compartment H occurs on the first card, the blackout of compartment J occurs on the second card, and the blackout of compartment K occurs on the third card, it is necessary that the first two cards of the group containing the dependent data be punched so as to cause compartment M to blackout thus signifying the presence of the dependent data. The hubs of all four compartments are plugged similar to that shown for compartment A while the switches S10, S11 and S12 are shifted to the position shown in Fig. 36d thereby establishing a parallel circuit around the respective cam controlled contacts CR18, CR19 and CR21 which normally drop out the signal relay associated therewith. The contacts SRH2, SRJ2 and SRK2 are serially connected through the closed switch S15 to the pocket selecting magnet BPM (Fig. 36b).

When a blackout of compartment H is detected in the first card of the group of cards containing the dependent data, a positive pulse is applied to the control grid of the tube T39 at the time that the plate potential is supplied thereto through the closing of the cam controlled contacts CR14 (Fig. 46) causing T39 to be made conducting. As in the manner explained previously, the relay SRH becomes energized and the associated contacts thereof closed at 270° machine time of the first card cycle when the cam controlled contacts CR15 make and the transfer relay TRA is energized.

Compartment M is used to signify that the information in compartment H is to be stored such that when a blackout of compartment M is detected, the tube T59 is made conducting, the relay SRM is energized and the associated contacts SRM1 (Fig. 36d) and SRM2 (Fig. 36b) are closed. The closing of the contacts SRM2 in conjunction with the closing of the cam controlled contacts CR30 at 240° machine time (Fig. 46) of the first card cycle causes a circuit to be completed from line 200, line 215, resistor R55, pick-up coil of the hold-over relay HOR, contacts SRM2 now closed and contacts CR30 now closed to the line 201 whereby the relay HOR becomes energized and the contacts HOR2 (Fig. 36b) and HOR4 (Fig. 36d) are closed.

The closing of the contacts HOR2 in addition to the closing of the cam controlled contacts CR31 at 0° machine time of the following card cycle energizes the hold coil of the hold-over relay HOR which circuit may be traced from line 200, line 215, resistor R55, the hold coil of relay HOR, contacts HOR2 now closed and contacts CR31 now closed to the line 201.

The closing of the contacts HOR4 (Fig. 36d) produces a holding circuit for the relay SRH which may be traced from the line 200, line 217, resistor R43, relay SRH, contacts SRH1 now closed, switch S10, contacts HOR4 now closed to the line 201. The setting up of this circuit through SRH and around the contacts CR18 prevents SRH from being restored to an unergized state when the contacts CR18 open at 30° machine time of the second card cycle.

The second card of the group containing the dependent data causes a blackout in compartments J and M which as set forth in the preceding paragraph produces a holding circuit in a similar manner for the relay SRJ and continues to hold the relay SRH.

The third card of the group containing the dependent data causes a blackout in compartment K resulting in the relay SRK being energized and the associated contacts closed. Since the third card of the group is the last card, it has been punched in card compartment M in a manner to prevent a blackout and the further setting up of the hold-over circuits. As a result, the relay SRM remains unenergized during the time the third card is being scanned and the corresponding hold-over contacts HOR4 and HOR5 also remain open.

The holding circuits for the relays SRH and SRJ are not broken due to the respective cam controlled contacts CR18 and CR19, which respectively parallel contacts HOR4 and HOR5, making at 210° machine time (Fig. 46) prior to the time that the contacts HOR4 and HOR5 open. The relays SRH and SRJ are kept in a holding position till 30° machine time of the fourth card cycle.

Prior to the relays SRH, SRJ and SRK returning to an energized state, the cam controlled contacts CR4 and CR5 make as shown in the timing diagram of Fig. 46 thereby causing the magnet BPM to be energized and the third card to be deposited in the B card pocket in a manner as previously described. The circuit for energizing the relay BPM at the time when the relays SRH, SRJ and SRK are energized may be traced from line 200, line 211, contacts CR4 which close at 10° machine time, contacts SRH2, SRJ2 and SRK2 all closed, switch S15, switch S2, resistor R12 to the control grid of V4 causing V4 to conduct resulting in the energization of the relay BPM when CR5 closes at 0° machine time.

However, if it is desired to have all the cards of the group containing the dependent data instead of only selecting the last card of the group, it is necessary that the switch S15 be open and the switch S18 (Fig. 36b) be closed. Thus when all of the relay SRH, SRJ and SRK are in an energized state at the time that the cam controlled contacts CR29 close, a circuit will be completed from the line 200, line 216, stop relay SR, contacts SRH3, SRJ3 and SRK3 all closed, switch S16 now closed, and the contacts CR29 now closed to the line 201 thereby causing the relay SR to be energized and the contacts SR2 in the hold circuit of the motor relay MR to open. With the hold circuit being open, the motor will then come to a stop at which time the three top cards in card pocket A which comprise the cards containing the dependent data may be removed and manually filed. The machine is then placed in operation for the scanning of the remaining cards being fed from the hopper.

While the twelve compartments have been each described in reference to a particular scanning operation it should be understood that this was done solely for the purpose of pointing out the various operations capable of being performed by the machine described herein. It is pointed out that any of the twelve compartments with the proper plugging connections may be used individually or collectively with any of the other compartments in order to enable a search to be made for a particular assemblage of data with a record card.

*Range scanning*

It has been shown heretofore that whenever a detail card bearing data in codified form favorably compares with a complementary punched master card thereby producing a "blackout" of the appropriate photocell and resulting in the energization of a relay associated therewith, the matching detail card is operated upon through the functioning of the relay and deposited in a selected pocket. Another operation which the scanning machine is capable of performing is that wherein the presence of a detail card bearing a scale of values may be detected during the scanning process when the values come within a particular range of numbers as sought for by the master or question card.

A scale of values is readily identifiable in a detail card by the distinguishing pattern in the U deck of perforations or designations in the Y position of all the columns forming the scale in addition to being accompanied by an index number, as shown in Fig. 37. Also in order that the scale of values may be differentiated from a term or expression notation within a card or a tabular notation it is necessary that the scale proper include at least two columns containing the values in descending digital denominations, as shown in Fig. 37.

A range of numbers may be obtained from the various scales set forth in the detail cards by deviating from the rule that a fixed number of holes are required in the master card by omitting one or more of the required holes in the master or question card. Thus it is to be noted that as the number of required question holes decrease, the number of matching conditions within a particular combination will be increased.

There is shown in Fig. 38 a portion of ten detail cards each showing a scale of values ranging from –0000– to –0009–, inclusive. The representations within the detail cards are denoted by the solid rectangles and it should be noted that these representations are set forth in the cards by resorting to the E subseries of the Major series. Likewise, there is shown in Fig. 38 a master or question card superimposed upon each of the detail cards. The representations within the master card are shown as open rectangles and it is to be observed that the units-tens column of each card contains only six question holes instead of the seven holes normally required while the hundreds-thousands column contains the normally required seven question holes.

Thus Figure 38 shows that the omission of seventh hole or, to express it in another way, the omission of the third hole within the I deck results in a matching condition for numbers –0000–, –0001– and –0002–. It follows therefore that if the master card contained question holes 9, 8, 7, 1, 0 and Y in the units-tens column instead of the pattern as shown a matching condition would occur for numbers –0005–, –0008– and –0009–. If a greater range of numbers is sought then the punching of only one question hole in the index position 4 of the I deck with the remaining question holes being the same as shown in Fig. 38 would result in a matching condition for numbers –0001–, –0002–, –0003–, –0004– and –0005–.

From the above discussion it becomes apparent that the various combinations of question holes within a column will produce a matching condition when compared with the detail cards of Fig. 38 for a certain number of these combinations. The table of Fig. 39 summarizes these various combinations which cause a matching condition for a particular set of values. In the table the last digit of each value of Fig. 38 is only represented such that the digit –1– represents the value –0001–. Likewise, inasmuch as the question holes for the U deck and the L deck remain the same for all of the values of Fig. 38, only the question holes for the I deck are set forth in the table.

The table of Figure 40 shows the results obtained if the master card contained only one question hole in the I deck instead of the three normally required.

It is to be observed from Figures 39 and 40 that of the various combinations of question holes set forth only the question holes 43, of Fig. 39, and the question hole 4, of Fig. 40, represent a true range of numbers with each producing complementary ranges either by acceptance or by rejection, which are the two ways by which a range of numbers may be sought. In all other cases whenever a true range is desired it becomes necessary to combine two or three questions where each question would call for a separate photocell compartment with the associated relay of each photocell coupled to each other in a manner to be described subsequently. For example, let it be assumed that all the detail cards falling within a range of –0000– to –0003– are wanted. In such a case it would be necessary to form two questions in order to produce the desired result inasmuch as the table of Fig. 39 does not set forth a single question which would produce the wanted range. Thus the questions to be combined would be question holes 43, which would detect those cards within the –0000– to –0002– range, and question holes 124 which would detect the value –0003– to complete the wanted range.

If a range of –0000– to –0004– is sought then the master card may be conditioned to ask the question in two different ways. In the first case the range is sought by combining the question holes 42 and 43 where each are assigned to a specific photocell compartment. The question holes 42 will create a matching condition for those cards containing any of the values –0000–, –0003– and –0004– while the question holes 43 will do likewise for those cards containing any of the values –0000–, –0001– and –0002– thereby depositing those cards within the range sought for in the selected pocket.

The second way of seeking those cards within a range of –0000– to –0004– from the cards of Fig. 38 is a method whereby one question will accept or cause a matching condition for more than the desired range while the second question will reject those cards selected by the first question which exceed the desired range. A particular combination of questions which will produce a range of –0000– to –0004– is that of question hole 4 and question holes 014. Each of these questions are assigned to a separate photocell compartment and associated relay where the relays of the two compartments are coupled to each other in a manner to be subsequently described. The question hole 4 will cause a matching condition to exist for all values ranging from –0000– to –0005– inclusive while the question holes 124 will reject all those cards having the value –0005– to thereby produce the desired range.

In the table of Fig. 41 there is set forth the various combinations of questions necessary to produce the desired ranges. The questions set forth are not the only possible combinations which will produce the desired ranges but are those questions which comprise the least number of question boxes so that a maximum of questions may be scanned for in a single run. It is to be noted that in some cases combinations are given in positive and negative form thus offering complementary forms by which the wanted range may be detected. The positive form or question denotes that when during a scanning period a matching condition occurs the detail card causing the matching condition will be deposited in a wanted pocket while the negative form or question denotes that whenever a matching condition occurs the card causing the matching condition will be deposited in the rejected pocket inasmuch as it is not within the wanted range.

The table of Fig. 41 also serves an additional useful function inasmuch as it also serves the tens digits in addition to the units digits shown. Since the units and tens digits are both written in the 2/5 code of the E subseries, it is only necessary to increase each of the numerals of a combination by 5 when referring to the tens digit. Thus, the combination for the range 1–7 given in the table as +4.32 becomes +9.87 for the range of 10–70.

As previously mentioned whenever a master card bearing a question favorably compares with the designations on a detail card a matching condition prevails thereby causing the "blackout" of the photocell associated with the question and resulting in the energization of a relay coil which closes a circuit thus enabling the card to be deposited in a selected pocket. But as pointed out in connection with Figures 39 and 40 and as shown in Fig. 41 usually more than one question must be formulated thus necessitating the use of more than one photocell compartment and the intercoupling of the relays associated with each photocell.

The terms constituting a question may be identified as $a$, $b$ and $c$ with each character necessitating the use of a separate photocell compartment and accompanying relay. For example, from Fig. 41 it is to be noted that the questions necessary to produce a range of 0–6 are +4.321 which may be written $+a.b$. The relay coupling arrangement between the two required compartments necessary to segregate the cards within the desired range is shown symbolically in Fig. 42a. In this arrangement the normal position of the relays $a$ and $b$ is that of being open while the closed position is assumed whenever a matching condition is detected by the photocell associated with each of the relays. Whenever a matching condition occurs in one compartment the relay $a$ will be shifted to a closed position and with relay $b$ of the second compartment remaining in the open position a circuit will be completed to the sort magnet. When a matching condition occurs in the other compartment the relay $b$ will be shifted to a closed position and with the relay $a$ remaining at the open position a complete circuit will be made to the sort magnet. Thus it is to be noted that a complete circuit will be made through the relays $a$ and $b$ to the sort magnet only when a matching condition is detected in either of the compartments associated with the relays $a$ and $b$. A complete circuit will not be made when the relays $a$ and $b$ are simultaneously in either an open or closed position. Likewise, it is to be observed that the presence of the period (.) which separates the questions in the various combinations of the table of Fig. 41 denotes that the combination will segregate the card only in the case of a two question combination as explained above with regard to the combination +4.321 or as in the case of a three question combination as +4.43.321 only when two of the questions of the combination are matched at one time.

An example of segregating the cards by seeking the complementary range is found when the range of 0–7 is sought. In this case the necessary questions are —210.310 (see Fig. 41) which expressed in terms of characters are reduced to $-a.b$. The relay coupling arrangement necessary to produce the desired range is symbolically shown in Fig. 42c. The negative sign before the combination indicates that the normal position of the relay is that of being closed which is shifted to an open position whenever a matching condition occurs. Thus upon comparing the questions with the detail cards of Fig. 38 it will be noted that relay $a$ will remain in a closed position for the values 0–8 but a circuit will be completed through relay $b$ to the sort magnet only for the values 0–7 inasmuch as the relay $b$ switches to an open position for the value 8. The relay $b$ remains in a closed position for those cards bearing the value 9 but no through circuit is made inasmuch as the relay $a$ switches to an open position for the value 9 which matches the question $a$.

An alternative way of obtaining the range of 0–7 is that where the questions +4;032 are used which may be expressed as $+a;b$. The relay coupling arrangement necessary to produce the range 0–7 is shown in Fig. 42b. In this arrangement the normal position of the relays $a$ and $b$ is that of being open. In this particular arrangement it is to be noted that a complete circuit to the sort magnet is made either when the relay $a$ or $b$ or both together assume a close position. Likewise it is to be noted that the presence of a semi-colon (;) amongst a series of questions in a combination as set forth in Fig. 41 indicates that the sort magnet will be energized whenever any or all of the questions are matched.

Various methods of obtaining ranges of greater extent than those previously described are shown in Fig. 43 in addition to the couplings of the relays of the compartments which are required to produce the desired result. In Fig. 43a there is shown the steps necessary to segregate those cards bearing values within a range of 49–73. The number of terms necessary to produce the desired range are broken down into three sub-ranges of 49, 50–69 and 70–73 which, upon resorting to the table of Fig. 41, calls for three questions thus necessitating the use of three compartments. The question for the value 49 is obtained from Fig. 41 by breaking the value up into two parts. The first part is the tens digit 4 with the portion of the question directed toward this digit being obtained by increasing the question of the range 4–4 from the units table of Fig. 41 by 555, as pointed out previously, which produces the numerals 975. The second part of the value 49 is the units digit 9 which is obtained by taking the question necessary to produce the range 9–9 which is +210. Thus the question necessary to produce all those cards bearing the value 49 is +975.210 which is expressed as $+a$. The relay in the relay coupling diagram which will operate upon the detection of the value 49 within a card is shown as $a$ and is in a normally open position.

The question for the next set of values covering the sub-range from 50–69 calls for two compartments and two intercoupled relays and is obtained from Fig. 41 by increasing by 555.555 the question necessary for a range of 5–6 which results in the question +965.876 and which may be expressed as $+b.c$. The relays associated with the question $+b.c$ are labeled $b$ and $c$ and each are in the normally open position with the closed position being assumed by the respective relays whenever a matching condition occurs.

The question for the last set of values necessary to complete the range is obtained by dividing the sub-range 70–73 into two parts. The first part is that of the tens digit 7 with the question for this particular digit being obtained from the table of Fig. 41 by increasing by 555 the numerals necessary to produce a range of 70–70 thus resulting in a question 875. The second part is that of the range of units digits 0–3 with the question for this range being +43.421 which is obtained directly from Fig. 41. Thus combining the questions for the two parts it is noted that the question necessary to obtain the sub-range 70–73 is +875.43.875.421 which may be expressed as $+d.e$. The relays associated with this question are labeled $d$ and $e$ with each of the relays being in a normal open position. The relays switch to a close position whenever a matching condition is detected.

From the relay coupling diagram of Fig. 43a it is to be observed that those detail cards bearing the value 49 will match the master card and result in the closing of the relay $a$ thereby causing the matched card to be stacked in a selected pocket. Also those cards bearing any sub-division of the value 50 will match the master card and cause relay $b$ to be shifted to a close position thereby completing a circuit through the closed position of relay $b$ and the open position of relay C to the sort magnet causing the matching cards to be deposited in the selected card pocket. The relay C becomes energized when any sub-division of 60 is detected in the detail card. In this case the circuit will be completed through the open position of relay $b$ and the closed position of relay C to the sort magnet. The relays $d$ and $e$ operate along the same lines as explained for the relays $b$ and $c$.

Another example of seeking a range is shown in Fig. 43b where one question accepts all those cards within a particular range which is greater than the wanted range while the remaining questions reject those detail cards bearing values which are within the range of the aforementioned first question but are outside of the desired range. In seeking those cards within the range of values 14–58, the desired range may be divided into three parts where the first part will accept all those cards within a range of 10–59, the second part will reject all those cards within a sub-range of 10–13 while the third part will reject those cards bearing the value 59.

The question for seeking the range 10–59 may be obtained by adding 5 to each digit of the combination of questions necessary to cover the range of 1–5 thus resulting in a combination of questions +9.987, expressed as $+a.b$, for the range 10–59. It is not necessary to add an additional question to cover the sub-division 0–9 of the value 50 inasmuch as the absence of holes in the I deck of the master card will detect the sub-division 0–9. The relays $a$ and $b$ will operate similar to the relays $a$ and $b$ of Fig. 42a when those cards bearing values within the range of 10–59 are detected.

Since the first question covers a range greater than that wanted it is necessary to reject those cards detected by the first question having values outside of the desired range and this may be done by asking a negative question. The combination of questions necessary to reject those cards bearing values 10–13 may be obtained from Fig. 41 by dividing the sub-range 10–13 into two parts. The first part is that question necessary to produce the range of the tens digit of the sub-range 10–13 and which question is −986 where the negative sign indicates that those cards causing a matching condition will be rejected. The second part is the question necessary to produce the units range of the sub-range 10–13 and which question is 43.421. Combining the questions of the two parts there results a combination of questions −986.43·986.421 which may be expressed as $-c.d$. The relays $c$ and $d$, of Fig. 43b, will operate similar to the relays $c$ and $d$ of Fig. 42c when those cards bearing values within the range of 10–13 are detected.

The third question necessary to supply those cards within the desired range is one where all those cards bearing the value 59 will be rejected. The question necessary to reject those cards bearing the value 59 is −965.210, expressed as $-e$. The relay for the compartment handling this question is coupled to the relay $d$ where the relay $e$ will remain in a closed position for all non-matching values but will open for the value 59.

In seeking a range of numbers amongst a scale of values represented in a detail card, the composite question must include at least one positive associated question since the presence of only a rejection type question would not only allow the passing of those bearing values within the particular range sought for but also all other possible information contained in the detail card. If a positive question is not automatically included in the composite question then it is necessary that such be included in the composite question. Where no positive question is included in the composite question then one should be included and it will assume a form where one compartment section of the master card will have punched therein only the index notation and the notation of the U deck with the remaining positions of the section lacking the presence of any notation whatsoever.

An example of a situation where a positive question is included in the composite question is shown in Fig. 43c. In this example it is desired that those detail cards bearing values within a range of 11–89 be deposited in the selected card pocket. The method employed in selecting those cards within the desired range is achieved by inserting in the master card two negative type questions where one question will result in the rejection of the values 00–09 or 90–99 while the second question will reject the value 10. But it is to be noted by asking two negative type questions that other cards bearing other information foreign to the scale of values will also be deposited in the selected card pocket thus it is necessary that a positive blank question accepting values within a range 0—99 be included in the composite question.

The question necessary to reject the values 00–09 or 90–99 is obtained from Fig. 41 by first seeking the question necessary to detect the presence of each of the tens digits in the aforementioned sub-ranges. The question necessary to detect the presence of the tens digit 0 in the range 00–09 is obtained from Fig. 41 in the manner previously pointed out and is found to be 987. The question necessary to detect the presence of the tens digit 9 in the range 90–99 is obtained from Fig. 41 also in a manner previously described and is found to be 765. The question necessary to detect the presence of the units digits 0–9 in each of the sub-ranges 00–09 and 90–99 is obtained directly from Fig. 41 and is a blank question which is inherently incorporated in the question directed towards the acceptance of the values 0–99 as shall be discussed subsequently. Thus the complete question necessary to reject the values 00–09 or 90–99 assumes the form of −987.765 which may be expressed as −$b.c$.

The question seeking to reject those cards bearing the value 10 therein is obtained by dividing the value 10 into a tens digit part, which is 1, and a units digit part which is 0. The portion of the question necessary to detect the tens digit 1 is obtained from Fig. 41 by adding 555 to the question necessary to produce a range of 1–1 thereby producing the question 986. The units digit question is obtained directly from the table of Fig. 41 and is 432. Thus the complete question necessary to reject the value 10 is −986.432 expressed as −$d$.

As pointed out previously, when negative questions are asked it is necessary that a positive question be made a part of the composite question. In this situation the positive question is a blank question containing only the index notation and the notation of the U deck whereby all values from 00–99 are accepted. This question in Fig. 43c is referred to as $a$ as is the relay associated therewith.

Referring to the relay diagram of Fig. 43c when a value 05 is detected in a detail card the relay $a$ will be shifted to the left thus completing a circuit through relay $b$ which remains in the position shown but relay $c$ will be shifted to the left thus preventing a circuit being completed to the sort magnet. When a value 15 is detected in a detail card the relay $a$ will be shifted to the left due to a matching condition, the relays $b$ and $c$ will remain in the position shown since no matching condition will be encountered in either of these compartments while the relay $d$ will remain in the position shown due to a non-matching condition thus enabling a circuit to be completed through the four intercoupled relays to the card selecting magnet.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A machine of the class described comprising means for feeding record cards having a plurality of fields containing codified data punched therein, a scanning unit comprising a source of light, a first and second light responsive element, a first and second electronic circuit means coupled to the corresponding element thereof, relay means coupled to said first circuit, and a master card having a plurality of fields, said master card containing the data sought for punched within these fields in a complementary fashion, the horizontal spacing between holes in adjacent columns of said record cards being less than the width of said holes of said record and master cards whereby unwanted indcations caused by said horizontal spacing are eliminated said cards being driven through said unit whereby a comparison mad be made with said master card, said light normally impinging upon said elements through said cards and said master card, the operation of said circuits being determined by the functioning of said elements such that said circuits are rendered operable when the light falling upon the corresponding element is cut off, means coupling said second circuit to said first circuit whereby said second circuit further controls the operation of said first circuit, said relay means becoming energized only when the sequence of data in said cards in conjunction with said master card causes said second element to be cut off from said source prior to said first element.

2. In a machine of the class described, a photoelectric scanning unit comprising a first and second light responsive element, a source of light, a first and second circuit arrangement, each including a normally conductive electron discharge device coupled to a normally non-conductive electron tube, said first and second elements being coupled to the corresponding one of said device, the status of said device and said tube being altered whenever said elements are blocked off from said source, means for coupling said tube of said second arrangement to the corresponding tube of said first arrangement, said coupling means further controlling the status of said tube of said first arrangement, relay means coupled to said first circuit arrangement, said relay means being energized only when said light impinges upon said second element and is blocked off from said first element.

3. A record card selecting system comprising means for successively feeding a plurality of cards bearing the codified information therein, a source of light, a plurality of light responsive elements, means for comparing said cards with a master question card while said cards are in motion, said light passing through said cards and said master card and impinging upon said elements during a non-matching condition of said cards with said master card, circuit means coupled to each of said elements, said circuit means becoming operative when said light source is blocked from said elements, relay means coupled to at least one of said circuits, means for selectively coupling said circuits for further controlling said one of said circuits by the other of said circuits, said relay being energized when the circuit associated therewith becomes operative at the instant when the other of said circuits indicates a non-matching condition.

4. A machine of the class described for analyzing record cards having a plurality of columns divided into three decks where said decks contain a fixed number of holes variously disposed within them to represent distinct characters comprising an analyzing station, said station comprising a source of light rays, a plurality of light responsive means, means for directing said rays upon said light responsive means, and a complementary punched master card interposed between said source and said light responsive means, means for continuously advancing said record cards past said station and relative to said master card to cause said cards to be compared with said master card while in motion, the horizontal spacing between holes in adjacent columns of said record cards being less than the width of said holes of said record and master cards whereby unwanted indications caused by said horizontal spacing are eliminated, said rays being interrupted when any of said cards favorably compares with said master card, circuit means operably associated with each of said light responsive means, said circuit means being selectively coupled to each other whereby selected conditions in said record cards may be detected, said circuit means being rendered operative during the matching condition, electromechanical means coupled to said coupled circuit means and operating upon said card when said card matches said master card.

5. A machine of the class described for scanning record cards having a plurality of columns divided into three decks and containing various items as represented by a fixed number of holes variously disposed in such columns among said decks comprising a photoelectric scanning device, means for feeding said record cards, said device including a source of light rays, a plurality of light responsive means, and a master card punched for the items being sought, said items being punched normally and complementarily in said record and master cards respectively, said record cards being compared with said master card while in motion relative thereto, the horizontal spacing between holes in adjacent columns of said record and master cards being less than the width of each of said holes whereby false matching indications caused by said horizontal spacings while such cards are in flight are prevented, said rays normally projecting upon said responsive means, said rays being blocked from said responsive means when any of said record cards favorably compares with said master card, a plurality of circuit means similar in number to said items and said responsive means, each of said circuit means coupled to the corresponding one of said light responsive means, the functioning of said circuit means being determined by said responsive means associated therewith, relay means operably associated with one of said circuit means, means for selectively coupling the other of said circuit means to said one of said circuit means such that the functioning of said one circuit means is further determined by said other circuit means whereby said relay is energized when said corresponding responsive means are sequentially blacked out pursuant to a matching condition being detected.

6. A card scanning system for simultaneously detecting the presence of a plurality of items disposed in a predetermined pattern in a record card where said card has said items entered therein in various locations of said card, each of said items of said card being disposed therein over a plurality of adjoining fixed field locations where said locations are divided into three decks containing a coding arrangement of a fixed number of holes combinationally disposed therein and representative of said items comprising a photoelectric analyzing unit, means advancing said card past said unit, said unit comprising a source of light rays, a first and second light responsive element, a first and second circuit means, and a master card having punched therein the sought for items, said master card having represented therein said sought for items in a complementary fashion, said card being compared with said master card while in motion relative thereto, each said element adapted to detect a matching condition over four fixed locations of said cards, said first circuit means including a first electron discharge device, said first element being coupled to said first circuit means such that said first device is rendered conducting when said first element is on and non-conducting when said first element is off where the operating condition of said element is determined by the condition of matching between said record card and said master card, said second circuit means including a second electron discharge device, said second device being controlled by said second element, relay means, means coupling said first device to said relay means, said second device being coupled to said first device whereby said second device further controls said first device, said relay means being energized only during a matching condition when said elements are simultaneously cut off from said source of light rays.

References Cited in the file of this patent
UNITED STATES PATENTS

| | | |
|---|---|---|
| 2,056,382 | Ayers | Oct. 6, 1936 |
| 2,095,298 | Tauschek | Oct. 12, 1937 |
| 2,203,013 | Ford | June 4, 1940 |
| 2,211,320 | Efron | Aug. 13, 1940 |
| 2,294,718 | Carroll | Sept. 1, 1942 |
| 2,319,108 | Broido | May 11, 1943 |
| 2,369,794 | Phinney et al. | Feb. 20, 1945 |
| 2,438,588 | Tolson | Mar. 30, 1948 |
| 2,448,761 | Armbruster | Sept. 7, 1948 |
| 2,448,830 | Robbins et al. | Sept. 7, 1948 |
| 2,478,275 | Johnson | Aug. 9, 1949 |
| 2,482,242 | Brustman | Sept. 20, 1949 |
| 2,493,847 | Ayres | Jan. 10, 1950 |
| 2,618,386 | Smain | Nov. 18, 1952 |

FOREIGN PATENTS

| | | |
|---|---|---|
| 420,352 | Italy | Apr. 23, 1947 |